United States Patent
Pandiri et al.

(10) Patent No.: US 11,853,649 B2
(45) Date of Patent: Dec. 26, 2023

(54) VOICE-CONTROLLED ENTRY OF CONTENT INTO GRAPHICAL USER INTERFACES

(71) Applicant: GOOGLE LLC, Mountain View, CA (US)

(72) Inventors: Srikanth Pandiri, Zurich (CH); Luv Kothari, Sunnyvale, CA (US); Behshad Behzadi, Freienbach (CH); Zaheed Sabur, Baar, CA (US); Domenico Carbotta, Zurich (CH); Akshay Kannan, Fremont, CA (US); Qi Wang, Palo Alto, CA (US); Gokay Baris Gultekin, Palo Alto, CA (US); Angana Ghosh, Mountain View, CA (US); Xu Liu, San Jose, CA (US); Yang Lu, Los Altos, CA (US); Steve Cheng, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/619,414

(22) PCT Filed: Dec. 13, 2019

(86) PCT No.: PCT/US2019/066211
§ 371 (c)(1),
(2) Date: Dec. 15, 2021

(87) PCT Pub. No.: WO2021/076166
PCT Pub. Date: Apr. 22, 2021

(65) Prior Publication Data
US 2022/0253277 A1    Aug. 11, 2022

Related U.S. Application Data

(60) Provisional application No. 62/915,607, filed on Oct. 15, 2019.

(51) Int. Cl.
*G06F 40/117* (2020.01)
*G06F 3/16* (2006.01)
(Continued)

(52) U.S. Cl.
CPC ............ *G06F 3/167* (2013.01); *G06F 3/0481* (2013.01); *G06F 3/0484* (2013.01);
(Continued)

(58) Field of Classification Search
CPC ...... G06F 3/167; G06F 3/0481; G06F 3/0484; G06F 3/04886; G06F 40/117;
(Continued)

(56) References Cited

U.S. PATENT DOCUMENTS 6,813,603 B1    11/2004  Groner et al.
10,762,114 B1 *  9/2020  Annunziata ............... G06F 9/54
(Continued)

FOREIGN PATENT DOCUMENTS

EP    2339576    6/2011
JP    2003108184    4/2003
(Continued)

OTHER PUBLICATIONS

European Patent Office; International Search Report and Written Opinion of PCT Ser. No. PCT/US2019/066211; 17 pages; dated Jul. 10, 2020 Jul. 10, 2020.

(Continued)

*Primary Examiner* — Keith D Bloomquist
(74) *Attorney, Agent, or Firm* — Gray Ice Higdon

(57) ABSTRACT

Implementations set forth herein relate to an automated assistant that can selectively determine whether to incorporate a verbatim interpretation of portions spoken utterances into an entry field and/or incorporate synonymous content into the entry field. For instance, a user can be accessing an interface that provides an entry field (e.g., address field) for (Continued)

receiving user input. In order to provide input for entry field, the user can select the entry field and/or access a GUI keyboard to initialize an automated assistant for assisting with filling the entry field. Should the user provide a spoken utterance, the user can elect to provide a spoken utterance that embodies the intended input (e.g., an actual address) or a reference to the intended input (e.g., a name). In response to the spoken utterance, the automated assistant can fill the entry field with the intended input without necessitating further input from the user.

17 Claims, 10 Drawing Sheets

(51) Int. Cl.
*G06F 40/143* (2020.01)
*G06F 40/30* (2020.01)
*G06F 40/174* (2020.01)
*G06F 3/0481* (2022.01)
*G06F 3/0484* (2022.01)
*G06F 3/04886* (2022.01)
*G10L 15/22* (2006.01)
*G10L 15/26* (2006.01)

(52) U.S. Cl.
CPC ........ *G06F 3/04886* (2013.01); *G06F 40/117* (2020.01); *G06F 40/143* (2020.01); *G06F 40/174* (2020.01); *G06F 40/30* (2020.01); *G10L 15/22* (2013.01); *G10L 15/26* (2013.01)

(58) Field of Classification Search
CPC ...... G06F 40/143; G06F 40/174; G06F 40/30; G06F 40/35; G10L 15/22; G10L 15/26; G10L 2015/223
See application file for complete search history.

(56) References Cited

U.S. PATENT DOCUMENTS

| | | | |
|---|---|---|---|
| 2002/0143533 A1 | 10/2002 | Lucas et al. | |
| 2006/0064302 A1 | 3/2006 | Ativanichayaphong et al. | |
| 2010/0169092 A1* | 7/2010 | Backes | G16H 10/60 |
| | | | 704/235 |
| 2012/0323557 A1 | 12/2012 | Koll et al. | |
| 2014/0343950 A1 | 11/2014 | Simpson et al. | |
| 2017/0263248 A1 | 9/2017 | Gruber et al. | |
| 2017/0308289 A1* | 10/2017 | Kim | G06F 3/0237 |
| 2017/0308291 A1* | 10/2017 | Luipold | G06F 16/90324 |
| 2017/0364484 A1* | 12/2017 | Hayes | G06F 40/109 |
| 2018/0074661 A1* | 3/2018 | Zhao | G10L 15/08 |
| 2018/0218033 A1 | 8/2018 | Utla et al. | |
| 2019/0079668 A1* | 3/2019 | Rao | G06F 3/04883 |
| 2019/0132437 A1* | 5/2019 | Fenoglio | H04M 1/7243 |
| 2019/0214013 A1* | 7/2019 | Meher | G06F 3/167 |
| 2019/0221208 A1* | 7/2019 | Chen | G06F 3/167 |

FOREIGN PATENT DOCUMENTS

| | | |
|---|---|---|
| JP | 2003296241 | 10/2003 |
| JP | 2006523988 | 10/2006 |
| JP | 2008052676 | 3/2008 |
| JP | 2014523543 | 9/2014 |
| JP | 2016038665 | 3/2016 |
| JP | 2019507895 | 3/2019 |
| WO | 2016057437 | 4/2016 |
| WO | 2019112646 | 6/2019 |
| WO | 2019142418 | 7/2019 |

OTHER PUBLICATIONS

Intellectual Property India; First Examination Report issued in Application No. 202127058246; 6 pages; dated Jun. 3, 2022.
Japan Patent Office; Notice of Allowance issued for Application No. 2021-574849, 4 pages, dated Feb. 20, 2023.
European Patent Office; Communication pursuant to Article 94(3) EPC issued in Application No. 19836758.3; 5 pages; dated Sep. 14, 2023.

* cited by examiner

VOICE-CONTROLLED ENTRY OF CONTENT INTO GRAPHICAL USER INTERFACES

BACKGROUND

Humans may engage in human-to-computer dialogs with interactive software applications referred to herein as "automated assistants" (also referred to as "digital agents," "chatbots," "interactive personal assistants," "intelligent personal assistants," "assistant applications," "conversational agents," etc.). For example, humans (which when they interact with automated assistants may be referred to as "users") may provide commands and/or requests to an automated assistant using spoken natural language input (i.e. utterances), which may in some cases be converted into text and then processed, and/or by providing textual (e.g., typed) natural language input. An automated assistant responds to a request by providing responsive user interface output, which can include audible and/or visual user interface output.

As mentioned above, an automated assistant can convert audio data, corresponding to a spoken utterance of a user, into corresponding text (or other semantic representation). For example, audio data can be generated based on detection of a spoken utterance of a user via one or more microphones of a client device that includes an assistant interface for enabling the user to interact with an automated assistant. The automated assistant can include a speech recognition engine that attempts to recognize various characteristics of the spoken utterance captured in the audio data, such as the sounds produced (e.g., phonemes) by the spoken utterance, the order of the produced sounds, rhythm of speech, intonation, etc. Further, the speech recognition engine can identify text words or phrases represented by such characteristics. The text can then be further processed by the automated assistant (e.g., using a natural language understanding (NLU) engine and/or a dialog state engine) in determining responsive content for the spoken utterance. The speech recognition engine can be implemented by the client device and/or by one or more automated assistant component(s) that are remote from, but in network communication with, the client device.

Separately from automated assistants, certain keyboard applications can enable a user to provide typed keyboard inputs through interaction with virtual keys being rendered by a keyboard application. Some of keyboard applications also enable a user to provide textual input via dictation. For example, a user can select a "microphone" graphical element on the keyboard and then provide a spoken utterance. The keyboard application can then convert any audio data characterizing the spoken utterance into corresponding text, and utilize the corresponding text as input to an application. Accordingly, those keyboard applications enable the user to dictate by voice in lieu of typing, and utilize a strict verbatim dictation as text to an application.

SUMMARY

Some implementations disclosed herein relate to processing audio data that captures a spoken utterance of a user to generate recognized text for the spoken utterance, and determining whether to provide, for incorporation into an entry field: (1) the recognized text itself, or (2) alternate content that is determined based on the recognized text. The alternate content is not an alternate speech-to-text recognition of the spoken utterance but, rather, is alternate content that is determined based on the recognized text. One or more properties of the recognized text and/or of the alternate content can be considered in determining whether to incorporate the recognized text or the alternate content into the entry field.

In some implementations, in determining whether to incorporate the recognized text of the alternate content into an entry field, one or more properties of the recognized content and/or the alternate content can be compared to parameter(s) related to a context in which a user provided a spoken utterance. As an example, in one context a user may be interacting with a webpage in order to provide contact information for receiving a service provided by the webpage. The user can select a portion of the webpage corresponding to an entry field that is identified as a "street address" field. Thereafter, the user can select a keyboard element to invoke an automated assistant (or the automated assistant can be invoked in any other manner, for instance automatically responsive to the keyboard application being brought to the foreground) and provide a spoken utterance such as, "My home." In response, the automated assistant can process the spoken utterance and cause a keyboard application to incorporate alternate content, which is a full home address of the user (e.g., "1111 West Muhammed Ali Blvd"), into the entry field in lieu of the recognized text "my home." This can be based on, for example, the automated assistant determining the entry field is a "street address" entry field and that the alternate content is itself a street address. Put another way, the automated assistant can compare a parameter related to the context (e.g., the entry field being a "street address" field) to a property of the alternate content (e.g., that the alternate content is a street address) in determining to incorporate the alternate content in lieu of the recognized text. The automated assistant can determine the entry field is an address utilizing various techniques such as, for example, consideration of XML or HTML of the webpage (e.g., XML or HTML tag(s) for the entry field), consideration of text and/or graphical elements that are near the entry field, and/or other technique(s).

However, when the user is communicating with another person via a messaging application, the user can receive a message such as, "Where are we meeting tonight?" from the other person. In response, the user can invoke the automated assistant and provide a spoken utterance such as, "My home." In response, the automated assistant can process the spoken utterance and cause the keyboard application to incorporate a verbatim interpretation of the spoken utterance (i.e., the text "my home"), rather than the full home address of the user. A decision to incorporate the verbatim interpretation can be based on contextual data and/or historical interaction data that characterizes previous instances in which the user and the other person communicated. Additionally, or alternatively, this decision can be based on whether the user has provided their full home address in similar contexts and/or when the user is messaging the other person. Based on this information, the verbatim interpretation can be biased over the full street address when determining whether to incorporate the verbatim content or alternate content.

Providing an automated assistant that adaptively selects content that is different from a verbatim interpretation of a spoken utterance can allow for shortened interaction time between users and automated assistants. This can reduce an amount of automatic speech recognition (ASR) processing that must be performed and also an amount of time that a device that receives and/or processes the spoken utterance remains on, thereby preserving power and other computational resources that may be expended by the device. For example, an amount of time that a user takes to recite their home address (e.g., "1111 West Muhammed Ali Blvd.") can be substantially longer relative to an amount of time that the user spends reciting the phrase "My home." Similarly, it may require more ASR processing to recognize the full address than it takes to recognize the shorter phrase. By allowing for condensed spoken utterances to replace otherwise lengthy spoken utterances, an overall duration of a user/device interaction can be lessened, thereby preserving power and/or other resources that would otherwise be consumed by a prolonged duration of user/device interaction. For example, the user/device interaction can conclude more quickly, enabling the device to transition to a reduced power state more quickly based on cessation of the interaction.

Further, implementations disclosed herein provide a common interface via which users can provide spoken utterances and that automatically (e.g., without requiring any further user input) differentiates between utterances that should result in providing recognized text for an entry field and utterances that should result in providing alternate content for the entry field. This can result in an improved human-computer interaction in which no further user interface inputs are required to alternate between a "dictation mode" and an "alternate content" mode. Put another way, the same interface can be utilized by users to provide spoken utterances for which corresponding recognized text will be provided for insertion into a corresponding entry field, as well as to provide spoken utterances based upon which alternate content is determined and provided for insertion into the corresponding entry field. Whether a "dictation" of the spoken utterance or "alternate content" based on the spoken utterance is provided can be based on one or more considerations described herein, and can be automatically determined without necessitating any explicit user input that explicitly indicates which should be provided.

Yet further, a separate application and/or separate interface need not be launched on the computing device to identify alternate content through prolonged user interaction with the separate application and/or interface. For example, in responding to a message of "when does your flight leave/arrive tomorrow", a user can provide, when a keyboard application is active for a message reply entry field, a spoken utterance of "insert details for my flight tomorrow." In response, alternate content that includes the user's flight details (e.g., departure airport and departure time, arrival airport and arrival time) can be determined and provided to the keyboard application for insertion, by the keyboard application, in the reply entry field in lieu of the recognized text "insert details for my flight tomorrow." Such alternate content is determined and provided for insertion without the user needing to open a separate application, search for the flight information using the separate application, copy the flight information, then return to the keyboard application to insert the flight information. Obviating the need for user interaction with a separate application and/or interface can reduce duration of the human-computer interaction and/or prevent the separate application from being executed, thereby conserving various computer resources.

In various implementations, the alternate content can be automated assistant content generated based on further processing of the recognized text using the automated assistant. For example, the recognized text can be processed using a natural language understanding (NLU) engine of the automated assistant to determine an automated assistant intent and/or values for the intent, and the alternate content determined based on being responsive to the intent and/or value(s).

In some implementations, the automated assistant can be an application that is separate from a keyboard application, and the automated assistant can interface with the keyboard application via an application programming interface (API) and/or any other software interface. The keyboard application can provide a keyboard interface. Optionally, the keyboard interface allows a user to invoke the automated assistant by, for example, tapping a keyboard element rendered at the keyboard interface. Additionally or alternatively, the automated assistant can be invoked automatically responsive to the keyboard interface being surface and optionally other condition(s) being satisfied (e.g., voice activity being detected) and/or the automated assistant can be invoked responsive to other automated assistant invocation user input(s) such as detection of a wake phrase (e.g., "OK Assistant", "Assistant", etc.), certain touch-gestures, and/or certain touch-free gesture(s). When the automated assistant is invoked and the keyboard is surfaced in a GUI of another application (e.g., a third party application), the user can provide a spoken utterance. The spoken utterance can be processed by the automated assistant responsive to the automated assistant being invoked, and the automated assistant can determine whether a dictation of the spoken utterance is to be provided or whether alternate content, that is based on the spoken utterance, is to be provided. The automated assistant can then provide, to the keyboard application, a command that causes either the dictation or the alternate content to be inserted by the keyboard into the corresponding entry field. Put another way, the automated assistant can determine whether the dictation or the alternate content is to be provided, then communicate (e.g., via a keyboard application API or operating system API) only the corresponding content to the keyboard application. For example, providing a spoken utterance, such as "My address", when the keyboard interface is being rendered and the automated assistant is invoked can, based on a context in which the spoken utterance was provided, cause the automated assistant to provide a command to the keyboard application. The command can, for example, cause the keyboard application to provide text that is a verbatim interpretation of the spoken utterance (e.g., "My address") or a different interpretation resulting in other content being output by the keyboard (e.g., "1111 West Muhammed Ali Blvd."). Allowing the automated assistant to interface with the keyboard application in this way provides for a lighter keyboard application that does not require instantiation of all automated assistant functions into memory and/or incorporation of automated assistant functions into the keyboard application itself (thereby reducing storage space required by the keyboard application). Rather, the keyboard application can rely on API calls from an automated assistant to effectively exhibit automated assistant functionality. Moreover, allowing the automated assistant to determine whether to provide a dictation of a spoken utterance or alternate content based on the spoken utterance, and communicate the corresponding data to a keyboard application enables this enhanced functionality to be utilized with any of a variety of different keyboard applications. So long as the keyboard application and/or an underlying operating system supports provisioning, to the keyboard application, of content to be inserted by the keyboard, the automated assistant can interface with any one of a variety of keyboard applications.

Some additional and/or alternative implementations set forth herein relate to an automated assistant that can infer what a user may be directing the automated assistant to do without the user explicitly reciting the intentions of the user verbatim. In other words, the user can provide a spoken utterance that references content the user intends the automated assistant to identify, and, in response, the automated assistant can cause certain operations to be performed using the referenced content over the words in the spoken utterance. As an example, a user can be interacting with an application, such as a web browser, in order to sign up for a particular service being offered by an entity, such as another person that operates a website that is being accessed by the user. When the user selects a particular entry field being rendered at an interface of the application, a keyboard interface and/or an automated assistant can be initialized. The user can then elect to provide a spoken utterance in order to cause certain content to be incorporated into the particular entry field that they selected.

In some implementations, the user can provide a spoken utterance that is directed to the automated assistant and references the content the user intends to incorporate into the entry field—but without reciting the content verbatim. As an example, when the entry field is an address field that is intended for the user to provide a property address into the entry field, the user can intend for the entry field to be where user is located—their home address (e.g., 2812 First St., Lagrange, KY). In order to have the home address incorporated into the entry field, the user can provide a spoken utterance such as, "Where I'm at, Assistant." In response to receiving the spoken utterance, audio data characterizing the spoken utterance can be processed in order to determine whether to incorporate one or more portions of verbatim content (e.g., "Where I'm at . . . ") of the spoken utterance into the entry field, or whether to incorporate other content that the user may be referring to. In order to make this determination, contextual data characterizing a context in which the user provided the spoken utterance can be processed.

In some implementations, the contextual data can characterize metadata that is stored in association with the interface that the user is accessing. For example, the metadata can characterize the entry field as an "address" field that necessitates a house number (e.g., "2812"). Therefore, in response to receiving the spoken utterance "Where I'm at, Assistant," the audio data can be processed to determine whether the user has explicitly recited any numbers. When the spoken utterance is determined to be void of numbers, the audio data and/or contextual data can be processed to determine whether to incorporate other content into the entry field (e.g., not incorporating content that is a verbatim recitation of at least a portion of the spoken utterance). In some implementations, the audio data can be processed to identify synonymous interpretations of the spoken utterance in order that other content can be supplemented and considered for incorporating into the entry field. Additionally, or alternatively, the audio data can be processed in order to determine whether the user has historically referenced the intended content in a similar spoken utterance and/or via any other input to a computing device and/or application. For instance, the audio data can be processed in view of other actions capable of being performed by the automated assistant.

As an example, the automated assistant can include functionality for rendering navigation data when a user provides a spoken utterance such as, "Assistant, when does the bus arrive at my location?" In response to the spoken utterance, the automated assistant can identify an address of a current location of the user in order to identify public transit routes that include the current location of the user. Similarly, the automated assistant can process the natural language content "my location" of the spoken utterance to determine that the spoken utterance may refer to an address—at least based on previous instances when the user has used the phrase "my location" in order to cause the automated assistant to use a command that incorporates a current address of the user as a parameter. Therefore, in response to the spoken utterance, other content identified via the automated assistant can include an address of a current location of the user (e.g., 2812 First St., Lagrange, KY). The other content identified can be further processed based on the contextual data that indicates that the entry field is intended to have some amount of numbers (e.g., a house number). Therefore, because the other content has numbers and satisfies the entry field, and is at least more satisfactory than one or more portions of a verbatim interpretation of the spoken utterance, the other content can be incorporated into the entry field (e.g., "Address Input: 2812 First St., Lagrange, KY).

In some implementations, a user can provide a spoken utterance that includes a portion for input to a selected entry field and another portion that is provided as a query to the automated assistant. For example, the user can be interacting with a third party application and select an entry field in furtherance of inputting text into the entry field. In response to selecting an entry field, a keyboard interface can be rendered at a graphical user interface (GUI) of the third party application. The keyboard interface can include a GUI element that, when selected by the user, causes an automated assistant to be invoked. For instance, when the user is attempting to respond to a recently received text message (e.g., "Jack: When are you heading to the movie?"), the user can select a text response field in order to cause the keyboard interface to surface at a display panel of a computing device. The user can then select the GUI element (e.g., a microphone graphic) rendered with the keyboard interface in order to cause the automated assistant to be invoked. When the automated assistant is invoked, the user can provide a spoken utterance that includes content that is responsive to the received text message and content that is an inquiry to the automated assistant (e.g., "I'm heading over now. Also, what is the weather, Assistant?").

In response to receiving the spoken utterance, audio data generated to characterize the spoken utterance can be processed using one or more speech to text models. Text resulting from the processing can be further processed in order to determine whether to incorporate all of the text into the selected entry field, some of the text into the entry field, and/or generate other content based on one or more portions of the resulting text. In some implementations, the resulting text can be processed using one or more models that can categorize portions of a spoken utterance as being directed to a selected entry field or as being provided as a query to the automated assistant. Additionally, or alternatively, the processing of the resulting text can be performed using contextual data that characterizes a context in which the user provided the spoken utterance. For instance, and with prior permission from the user, the contextual data can be based on prior input(s) from the user, text that is accessible via a currently active message interface, meta data stored in association with the selected entry field and/or any other entry field that is accessible via the third party application and/or a separate application of the computing device. The processing of the portions of resulting text can generate biases that characterize a portion of text as suitable for the selected entry field and/or not suitable as a query to the automated assistant. For instance, a portion of the resulting text can be designated as not suitable as an inquiry to the automated assistant but, based on contextual data, can be designated as suitable for incorporation in to the selected entry field.

When the resulting text has been processed, a portion of the text can be designated for incorporation into the selected entry field and another portion of the text can be designated as a query for the automated assistant. For example, a first portion of the text can include "I'm heading over now," which can be incorporated into the selected entry field, and the second portion of the text can include "Also, what is the weather, Assistant," which can be processed via the automated assistant as a query. Therefore, the automated assistant can cause the first portion of text to be incorporated into the selected entry field and can generate a response to the second portion of text such as, "The weather tomorrow is cloudy with a high of 72 and a low of 65."

In some implementations, when the first portion of the text (e.g., "I'm headed over now") has been included into the text field for responding to the message, the automated assistant can await confirmation that the user would like the message to be sent. For example, the first portion of the text can occupy a text field for responding to the incoming message, and the user can provide a spoken utterance such as, "Send message," to the automated assistant in order to cause the message to be transmitted. In some implementations, the text field can be rendered as an interface of a third party messaging application and, therefore, in response to receiving the spoken utterance "Send message," the automated assistant can communicate with the third party messaging application to cause the message to be transmitted.

Alternatively, or additionally, the user can elect to modify the message prior to directing the automated assistant to send the message by commanding the automated assistant to modify content of the draft message. For example, when the automated assistant has caused a text field of the messaging application to include content of the spoken utterance, "I'm headed over now," the user can issue a subsequent spoken utterance such as, "Delete the last word," "Replace the last word with 'in 15 minutes,'" or "Replace 'now' with 'soon.'" In response, the automated assistant can interact with the messaging application in order to modify the content of the draft message according to the subsequent spoken utterance from the user. In some implementations, the automated assistant can effectuate changes to the content via one or more inputs to an operating system of the computing device that is executing the messaging application. Alternatively, or additionally, the automated assistant can effectuate changes to the content by interfacing with the messaging application via an application programming interface (API) that allows the automated assistant to control the messaging application.

Additionally, or alternatively, the automated assistant can effectuate changes to the content via an API for interfacing with a keyboard application. The keyboard application can have capabilities for interacting with third party applications, such as a third party messaging application, in order to allow a user to edit content, execute searches, and/or perform any other function of the third party application that can at least be initialized via a separate keyboard application. The keyboard API can therefore allow the automated assistant to also control the keyboard application in order to initialize execution of such functions of the third party application. Therefore, in response to receiving a subsequent spoken utterance for editing content of a draft message (e.g., "Delete the word 'now.'"), the automated assistant can interact with the keyboard application via the keyboard API in order to cause the word "now" to be deleted from the content of the draft message. Thereafter, the user can cause the message to be sent by providing the spoken utterance "Send message," which can cause the automated assistant to interface with the keyboard API in order that a "send" command will be communicated to the messaging application—as if the user tapped a "send" button of the keyboard GUI.

In some implementations, should the user elect to add additional content to the draft message, such as an image, emoji, or other media, the user can provide a subsequent spoken utterance such as, "Add a 'thumbs up.'" In response, the automated assistant can use content of the subsequent spoken utterance, "thumbs up," to search media data provided by the messaging application and/or the operating system in order to identify a suitable graphic to insert into the draft message. Alternatively, or additionally, the user can cause the automated assistant to render search results for "GIFs" that may correspond to the content of the subsequent spoken utterance. For example, in response to receiving a subsequent spoken utterance such as, "Show me 'thumbs up' GIFs," the automated assistant can cause the operating system and/or the messaging application to open a search interface of a keyboard GUI, and cause a search query of "thumbs up" to be executed at the search interface. The user can then select a desired GIF by tapping a particular location of the keyboard GUI or issuing another spoken utterance that describes the desired GIF of the user. For instance, the user can provide another spoken utterance such as, "The third one," in order to cause the automated assistant to select the "third" GIF listed in the search results and incorporate the "third" GIF into the content of the draft message. Thereafter, the user can elect to send the message by issuing the spoken utterance, "Send message."

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
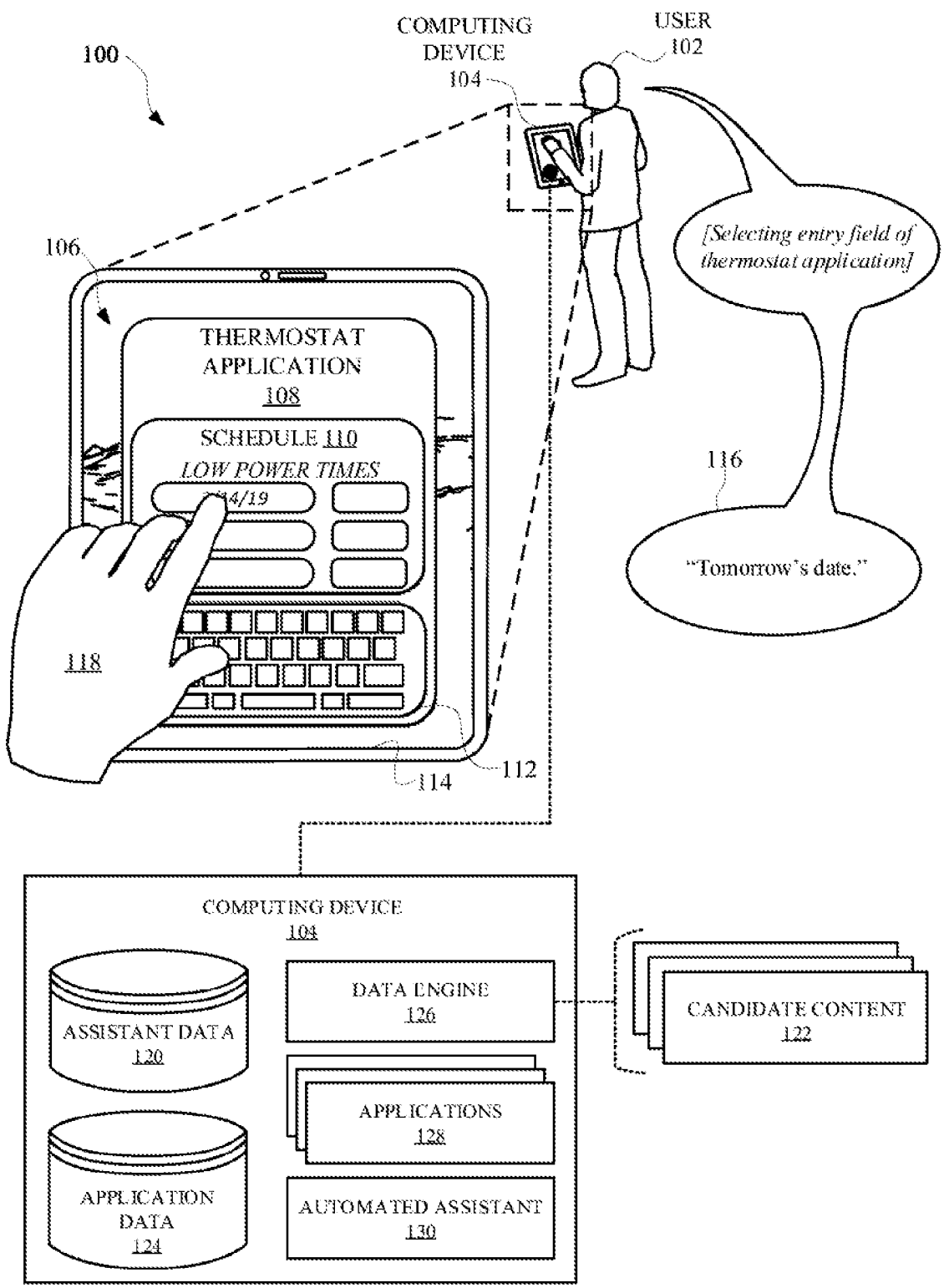
FIG. 1A, FIG. 1B, and FIG. 1C illustrate views of a user reciting a reference to content to be incorporated into an entry field with or without necessarily reciting the content verbatim.
Figure 1B:
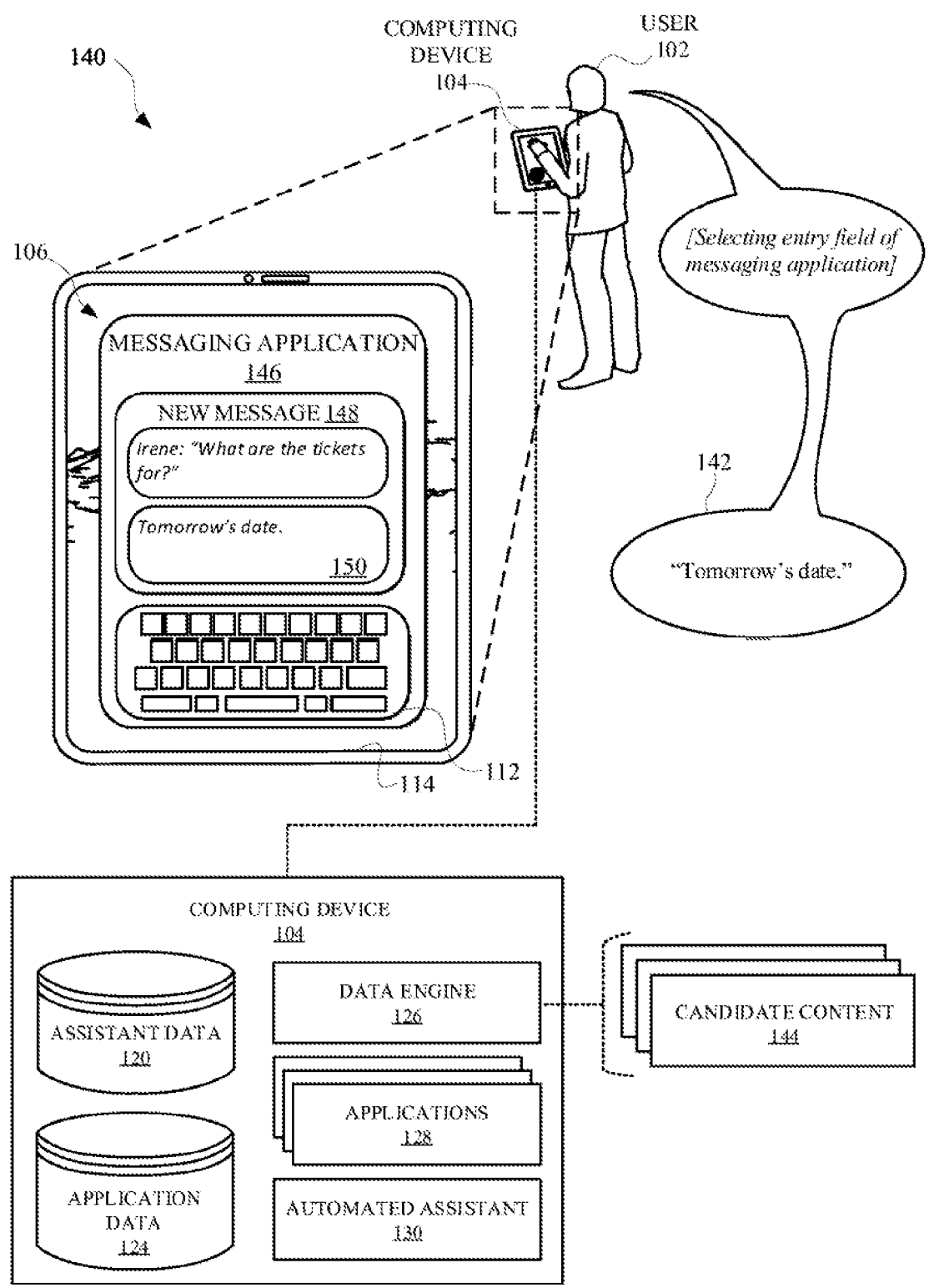

FIG. 1A, FIG. 1B, FIG. 1B illustrate a view 100, a view 140, and a view 160 respectively, of a user 102 reciting a reference to content to be incorporated into an entry field with or without necessarily reciting the content verbatim. The user 102 can initially interact with an application, such as a thermostat application 108 in order to setup a schedule 110 during which the thermostat application 108 will operate according to a low power mode. For instance, the user 102 can interact with the thermostat application 108 by using their hand 118 to select a particular entry field of the schedule 110 interface of the thermostat application 108. In response to the user 102 selecting the entry field, the thermostat application 108, an automated assistant 130, and/or an operating system of a computing device 104 can optionally cause a keyboard interface 112 to be rendered at a display panel 106 of the computing device 104.

In order to provide content to be incorporated into the selected entry field, the user 102 can type the content via the keyboard interface 112 and/or provide a spoken utterance that includes and/or references the content. For example, as provided in FIG. 1A, the user 102 can provide a spoken utterance 116 such as "Tomorrow's date, Assistant?" Audio data generated based on the spoken utterance can be processed at a data engine 126 of the computing device 104 in order to generate candidate content 122. The candidate content 122 can be generated based on assistant data 120, application data 124, and/or any other data that can be accessed by the automated assistant 130. In some implementations, the application data 124 can indicate that the selected entry field is formatted to receive dates. Therefore, when candidate content 122 is being generated by the data engine 126, the data engine 126 can bias toward selecting candidate content 122 that is formatted as dates over other candidate content 122.

FIG. 1B illustrates a view 140 of the user interacting with a messaging application 146 in order to incorporate content into the selected entry field (e.g., a new message 148) of the messaging application 146. Furthermore, the automated assistant 130 can further process a spoken utterance 142 from the user 102 in order to determine whether to generate content for an entry field 150 that is the same as the content (e.g., "3/14/19") generated in FIG. 1A or different content— despite the same spoken utterance (e.g., "Tomorrow's date") being provided. For example, audio data generated from the spoken utterance 142 can be converted into text that can be processed in combination with contextual data in order to determine content that would be suitable for incorporating into the entry field 150. For example, the text can be processed using one or more machine learning models that are trained to provide a candidate interpretation(s) for the text at least partially based on a context in which the spoken utterance was provided. Thereafter, each candidate interpretation can be processed to identify a candidate interpretation that is most suitable in the given context.

For example, contextual data generated based on circumstances of FIG. 1A can indicate that the user 102 is accessing a thermostat application 108 to provide dates into a schedule 110 for controlling a thermostat. Furthermore, the contextual data can characterize limitations of the fields, such as a limitation that the field must receive at least some amount of numerical input characterizing a date. Therefore, any candidate interpretations generated by the automated assistant 130 that include numbers can be prioritized over candidate interpretations that do not include numbers. Furthermore, contextual data generated based on circumstances of FIG. 1B can indicate that the user 102 is access a messaging application 146 in order to provide a responsive message to a previously received message (e.g., "Irene: "What are the tickets for?"). This contextual data can characterize a status of the messaging application 146, content being rendered at an interface of the messaging application 146 (e.g., the prior message from "Irene" and/or other preceding message(s)), and/or any other information that be associated with the circumstances of a user accessing a message via a computing device 104.

In some implementations, a candidate interpretation of the spoken utterance 142 can be "Tomorrow's date," and other additional content can be generated based on text of the spoken utterance 142. Candidate content 144, which can include the candidate interpretation and the other content can be processed to identify the most suitable content to incorporate into the entry field 150. For example, an entry in the candidate content 144 can include "3/14/19," which can be a numerical representation of a day following the day the user 102 is accessing the messaging application 146. The candidate content 144 can be processed using one or more machine learning models, which can be different from one or more machine learning models used to process audio data characterizing the spoken utterance 142. Based on processing of the candidate content 144, the candidate interpretation "Tomorrow's date" can be prioritized over any other candidate content, and the candidate interpretation can be incorporated into the entry field 150. Processing spoken utterances in this way can preserve computational resources that might otherwise be wasted in circumstances where a user is required to more distinctly specify the purpose of each portion of a spoken utterance. As noted above, the contextual information utilized in determining to provide the candidate interpretation "tomorrow's date", in lieu of the candidate content 144 of "3/14/19" can include the prior message from "Irene". It is noted that, in some implementations, had Irene's message instead been, for example "what date again?", then the candidate content 144 of "3/4/29" may instead be provided in lieu of the candidate interpretation "tomorrow's date".

Figure 1C:
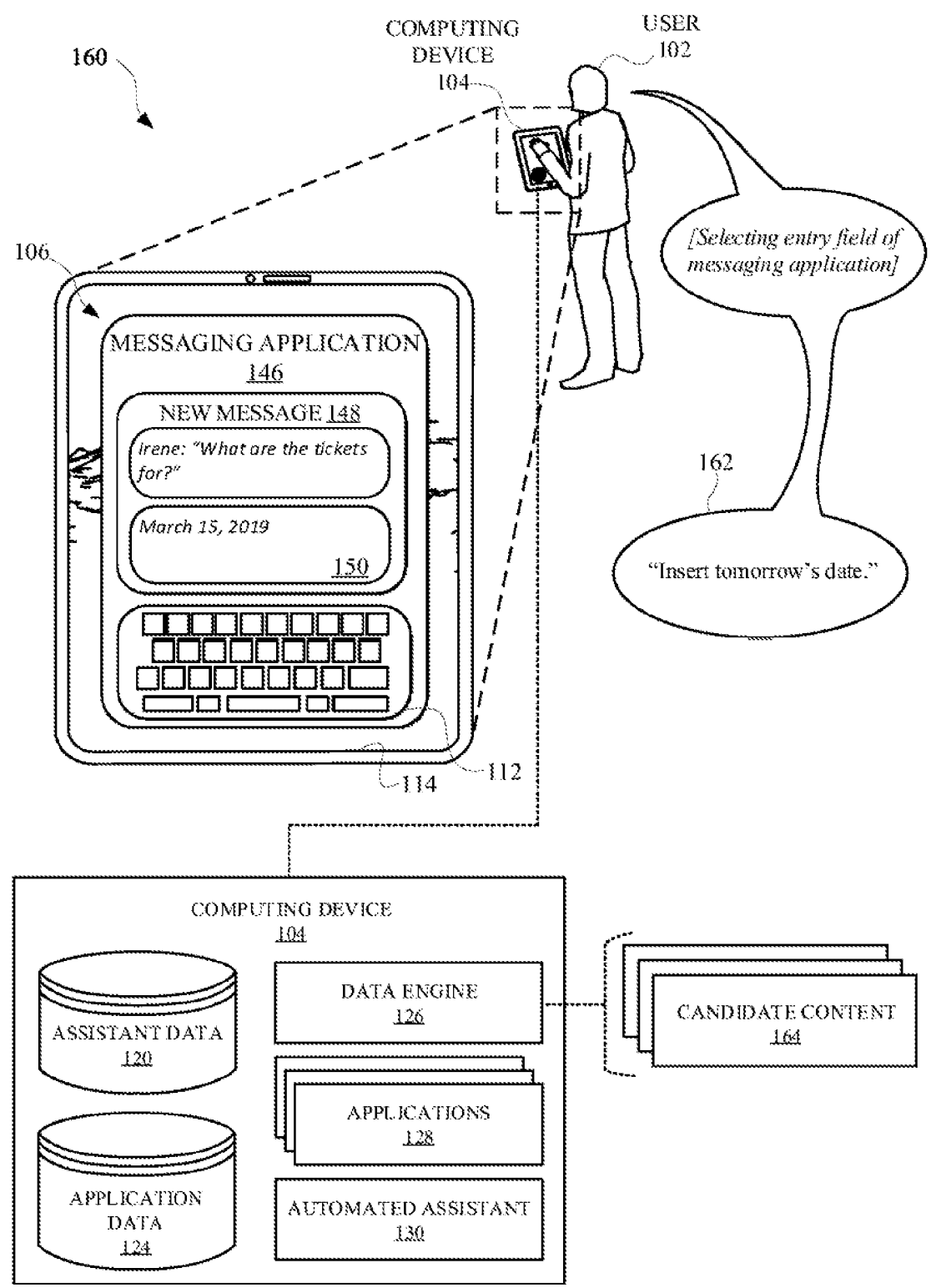

In some implementations, as provided in view 160 of FIG. 1C, natural language content of the spoken utterance 142 can be processed to determine whether the natural language content embodies an automated assistant command. For example, the natural language content can be processed using a natural language understanding engine to determine whether an intent corresponding to a particular assistant action is embodied in the natural language content. When the natural language content embodies an intent, the automated assistant can initialize performance of the particular assistant action (e.g., recalling a date to be "inserted" into the entry field 150). However, when an intent is not embodied in the natural language content, one or more portions of the natural language content can be incorporated into the entry field 150. In some implementations, a determination to incorporate the natural language content and/or alternatively natural language content into the entry field 150 can be based on one or more properties of the entry field 150 (e.g., HTML, XML, text and/or graphics that are within a threshold distance from an entry field).

As illustrated in FIG. 1C, the user 102 can receive a new message 148 at their computing device 104 and select a portion of the interface rendering the new message 148 in order to provide a responsive message to the sender (e.g., "Irene"). The user 102 can cause the automated assistant 130 to incorporate the phrase "Tomorrow's date," as illustrated in FIG. 1B by omitting natural language in their spoken utterance that would embody an assistant intent (e.g., "Respond . . . ", "Insert . . . ", etc.). However, in order to cause the automated assistant 130 to incorporate alternate content (e.g., content that may be different from the verbatim natural language content), the user 102 can incorporate an assistant intent into a spoken utterance 162. For instance, the spoken utterance 162 can include a command "Insert tomorrow's date." Candidate content 164 can be generated in response to the spoken utterance 162, and a selection of content to incorporate into the entry field 150 can be biased according to a context in which the user 102 provided the spoken utterance 162. For example, the automated assistant 130 can determine to bias away from inserting the verbatim content "Insert tomorrow's date" into the entry field 150 and, instead, bias toward an alternative interpretation of the natural language content (e.g., "tomorrow's date") that is separate from the identified intent (e.g., "Insert"). As a result, suitable additional content can be identified (e.g., Mar. 15, 2019) and incorporated into the entry field 150.

Figure 2A:
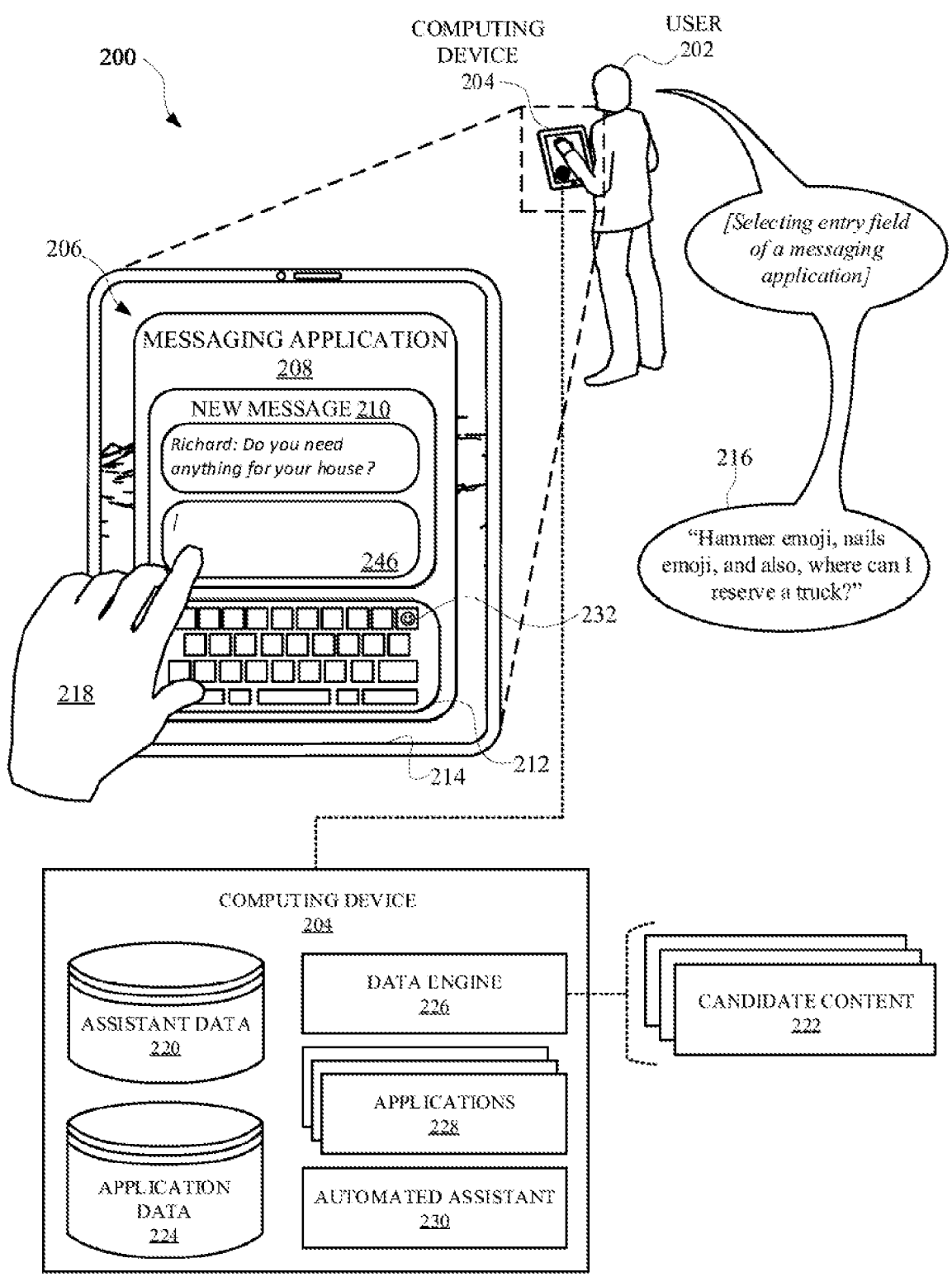
FIG. 2A and FIG. 2B illustrate views of a user reciting a reference to image content to be incorporated into an entry field without explicitly selecting the image content.
Figure 2B:
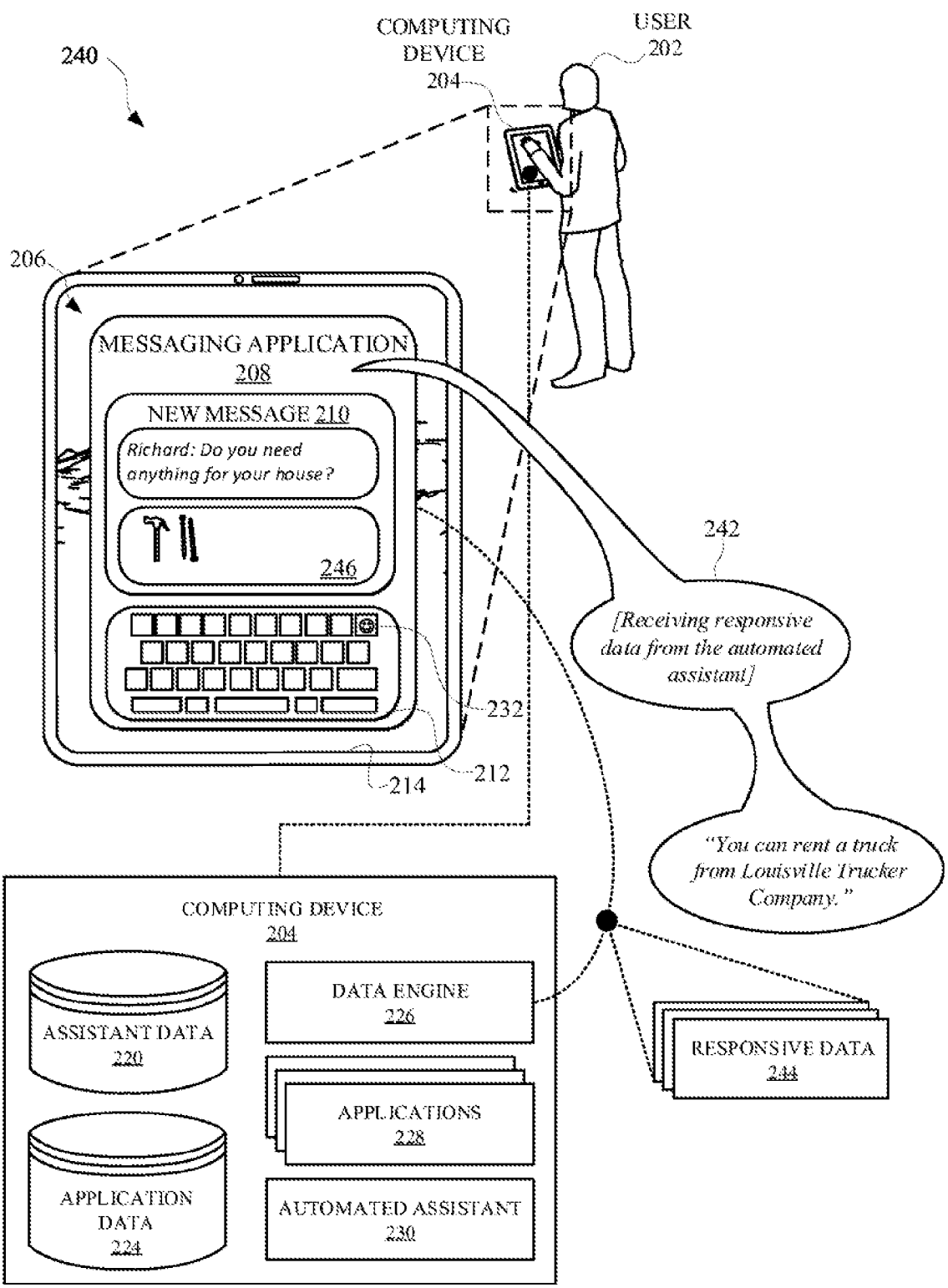

FIG. 2A and FIG. 2B illustrate a view 200 and a view 240, respectively, of a user 202 reciting a reference to image content to be incorporated into an entry field without necessarily explicitly selecting the image content. The user 202 can initially interact with an application, such as a messaging application 208 in order to send a new message 210 to a particular contact (e.g., Richard). For instance, the user 202 can interact with the messaging application 208 by using their hand 218 to select a particular entry field 246 of a graphical user interface of the messaging application 208. In response to the user 202 selecting the entry field, the messaging application 208, an automated assistant 230, and/or an operating system of a computing device 204 can optionally cause a keyboard interface 212 to be rendered at a display panel 206 of the computing device 204. The keyboard interface 212 can include a keyboard element 232 that, when selected by the user, invokes the automated assistant 230 to assist the user with providing content to be incorporated into the selected entry field 246. The automated assistant 230 can be a separate application from a keyboard application that provides the keyboard interface 212. However, the automated assistant 230 can provide commands to the keyboard application based on spoken utterances provided by the user 202. The commands can be provided by the automated assistant 230 to the keyboard application via an API, inter-process communications, and/or any other technique for communicating between applications. In some implementations, containers of the keyboard application can be instantiated in memory simultaneous to containers of the automated application being instantiated in memory.

In order to provide content to be incorporated into the selected entry field 246, the user 202 can type the content via the keyboard interface 212 and/or provide a spoken utterance that includes and/or references the content. For example, as provided in FIG. 2A, the user 202 can provide a spoken utterance 216 in response to a message (e.g., "Do you need anything for your house?"). The spoken utterance 216 can be, "Hammer emoji, nails emoji, and also, where can I reserve a truck?" Audio data generated based on the spoken utterance can be processed at a data engine 226 of the computing device 204 in order to generate candidate content 222. The candidate content 222 can be generated based on assistant data 220, application data 224, and/or any other data that can be accessed by an automated assistant 230. In some implementations, the application data 224 can indicate the selected entry field is formatted to receive text and/or images.

FIG. 2B illustrates a view 240 of the computing device 204 rendering responsive data 244 at the messaging application 208 in order to incorporate content into the selected entry field 246 of the messaging application 208. For example, metadata can be stored at the computing device 204 for characterizing certain emojis. Therefore, in response to receiving the spoken utterance 216, the computing device 204 can determine that the word "hammer" is stored in association with a particular emoji and the word "nails" is stored in association with a particular emoji. Each emoji can then be incorporated into the entry field 246 as provided in FIG. 2B.

Furthermore, the automated assistant 230 can further process the spoken utterance 216 from the user 202 in order to determine whether any other portion of the spoken utterance 216 has not been responded to by the automated assistant 230. For example, audio data generated from the spoken utterance 216 can be converted into text that can be parsed in order to identify separate portions of the text that correspond to separate intentions of the user 202. For example, the text can be processed using one or more machine learning models that are trained to classify portions of natural language content that have been compiled together as a continuous input from a user 202. Thereafter, a particular portion of the text can be processed using another machine learning model (e.g., image description model) corresponding to a classification of text corresponding to the particular portion, and another portion of text can be processed using a different machine learning model (e.g., navigation search model) corresponding to another classification of the text corresponding to the other portion of the text.

As an example, a first portion of the text can be "hammer emoji, nails emoji," which when processed, can result in candidate content 222 such as a file location for each emoji depicted in the entry field 246 of FIG. 2B. Furthermore, a second portion of the text can be "also, where can I reserve a work truck," which when processed can result in other candidate content 222 such as "Louisville Trucker Company." The other candidate content 122 can then be incorporated into an output 242 of the automated assistant 230, simultaneous to the automated assistant 230 incorporating the candidate content 122 into the entry field 246. Processing a spoken utterances in this way can preserve computational resources that might otherwise be wasted in circumstances where a user is required to more distinctly specify the purpose of each portion of a spoken utterance.

Figure 3:
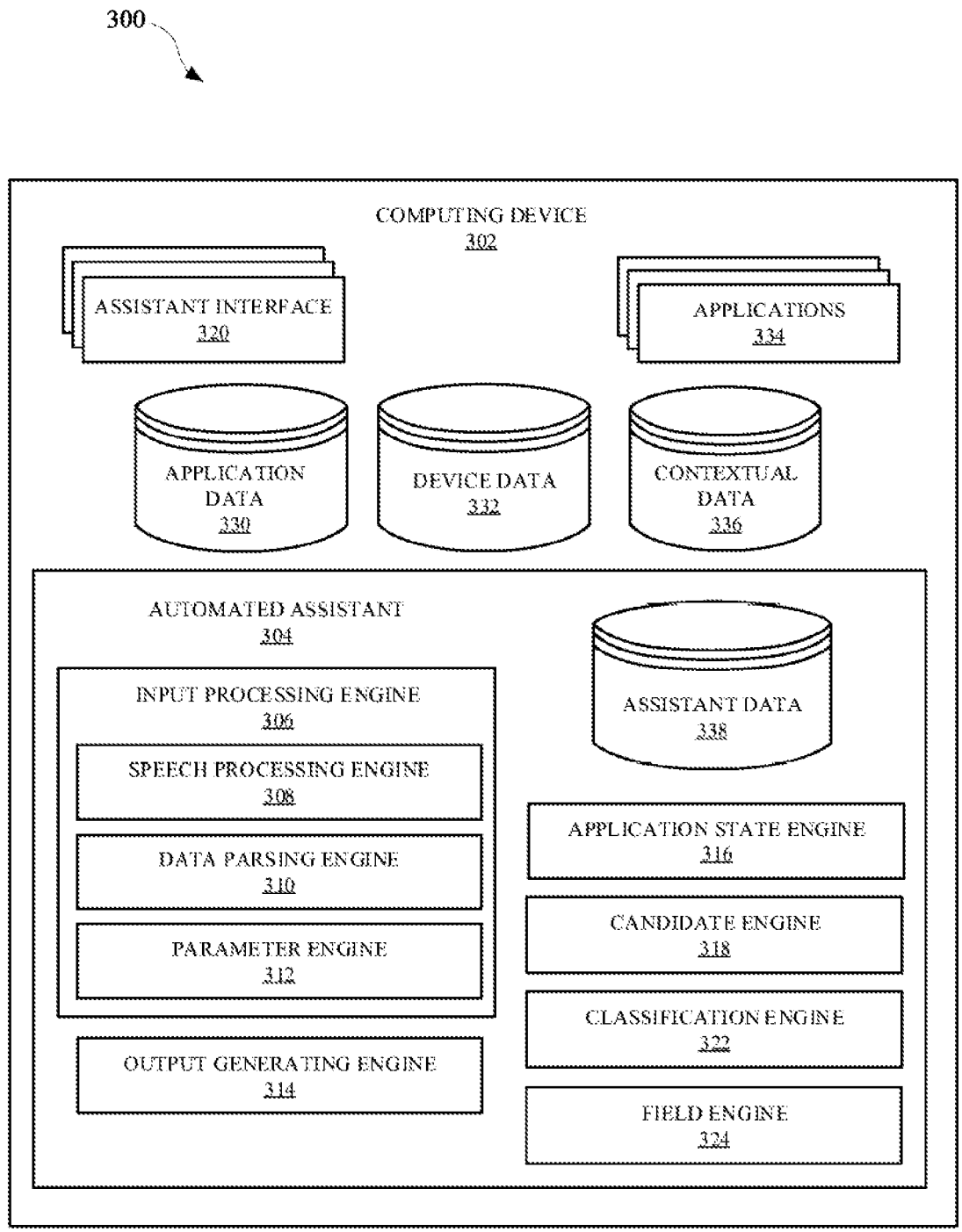
FIG. 3 illustrates a system for providing an automated assistant that can selectively determine whether to incorporate a verbatim interpretation of portions spoken utterances into an entry field and/or incorporate synonymous content into the entry field.

FIG. 3 illustrates a system 300 for providing an automated assistant that can selectively determine whether to incorporate a verbatim interpretation of portions spoken utterances into an entry field and/or incorporate synonymous content into the entry field. The automated assistant 304 can operate as part of an assistant application that is provided at one or more computing devices, such as a computing device 302 and/or a server device. A user can interact with the automated assistant 304 via assistant interface(s) 320, which can be a microphone, a camera, a touch screen display, a user interface, and/or any other apparatus capable of providing an interface between a user and an application. For instance, a user can initialize the automated assistant 304 by providing a verbal, textual, and/or a graphical input to an assistant interface 320 to cause the automated assistant 304 to perform a function (e.g., provide data, control a peripheral device, access an agent, generate an input and/or an output, etc.). The computing device 302 can include a display device, which can be a display panel that includes a touch interface for receiving touch inputs and/or gestures for allowing a user to control applications 334 of the computing device 302 via the touch interface. In some implementations, the computing device 302 can lack a display device, thereby providing an audible user interface output, without providing a graphical user interface output. Furthermore, the computing device 302 can provide a user interface, such as a microphone, for receiving spoken natural language inputs from a user. In some implementations, the computing device 302 can include a touch interface and can be void of a camera, but can optionally include one or more other sensors.

The computing device 302 and/or other third party client devices can be in communication with a server device over a network, such as the internet. Additionally, the computing device 302 and any other computing devices can be in communication with each other over a local area network (LAN), such as a Wi-Fi network. The computing device 302 can offload computational tasks to the server device in order to conserve computational resources at the computing device 302. For instance, the server device can host the automated assistant 304, and/or computing device 302 can transmit inputs received at one or more assistant interfaces 320 to the server device. However, in some implementations, the automated assistant 304 can be hosted at the computing device 302, and various processes that can be associated with automated assistant operations can be performed at the computing device 302.

In various implementations, all or less than all aspects of the automated assistant 304 can be implemented on the computing device 302. In some of those implementations, aspects of the automated assistant 304 are implemented via the computing device 302 and can interface with a server device, which can implement other aspects of the automated assistant 304. The server device can optionally serve a plurality of users and their associated assistant applications via multiple threads. In implementations where all or less than all aspects of the automated assistant 304 are implemented via computing device 302, the automated assistant 304 can be an application that is separate from an operating system of the computing device 302 (e.g., installed "on top" of the operating system)—or can alternatively be implemented directly by the operating system of the computing device 302 (e.g., considered an application of, but integral with, the operating system).

In some implementations, the automated assistant 304 can include an input processing engine 306, which can employ multiple different modules for processing inputs and/or outputs for the computing device 302 and/or a server device. For instance, the input processing engine 306 can include a speech processing engine 308, which can process audio data received at an assistant interface 320 to identify the text embodied in the audio data. The audio data can be transmitted from, for example, the computing device 302 to the server device in order to preserve computational resources at the computing device 302. Additionally, or alternatively, the audio data can be exclusively processed at the computing device 302.

The process for converting the audio data to text can include a speech recognition algorithm, which can employ neural networks, and/or statistical models for identifying groups of audio data corresponding to words or phrases. The text converted from the audio data can be parsed by a data parsing engine 310 and made available to the automated assistant 304 as textual data that can be used to generate and/or identify command phrase(s), intent(s), action(s), slot value(s), and/or any other content specified by the user. In some implementations, output data provided by the data parsing engine 310 can be provided to a parameter engine 312 to determine whether the user provided an input that corresponds to a particular intent, action, and/or routine capable of being performed by the automated assistant 304 and/or an application or agent that is capable of being accessed via the automated assistant 304. For example, assistant data 338 can be stored at the server device and/or the computing device 302, and can include data that defines one or more actions capable of being performed by the automated assistant 304, as well as parameters necessary to perform the actions. The parameter engine 312 can generate one or more parameters for an intent, action, and/or slot value, and provide the one or more parameters to an output generating engine 314. The output generating engine 314 can use the one or more parameters to communicate with an assistant interface 320 for providing an output to a user, and/or communicate with one or more applications 334 for providing an output to one or more applications 334.

In some implementations, the automated assistant 304 can be an application that can be installed "on-top of" an operating system of the computing device 302 and/or can itself form part of (or the entirety of) the operating system of the computing device 302. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 302. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to Internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 302 can include one or more applications 334 which can be provided by a third-party entity that is different from an entity that provided the computing device 302 and/or the automated assistant 304. An application state engine 316 of the automated assistant 304 and/or the computing device 302 can access application data 330 to determine one or more actions capable of being performed by one or more applications 334, as well as a state of each application of the one or more applications 334. Furthermore, the application data 330 and/or any other data (e.g., device data 332) can be accessed by the automated assistant 304 to generate contextual data 336, which can characterize a context in which a particular application 334 is executing at the computing device 302 and/or a particular user is accessing the computing device 302 and/or accessing an application 334.

While one or more applications 334 are executing at the computing device 302, the device data 332 can characterize a current operating status of each application 334 executing at the computing device 302. Furthermore, the application data 330 can characterize one or more features of an executing application 334, such as content of one or more graphical user interfaces being rendered at the direction of one or more applications 334. Alternatively, or additionally, the application data 330 can characterize an action schema, which can be updated by a respective application and/or by the automated assistant 304, based on a current operating status of the respective application. Alternatively, or additionally, one or more action schemas for one or more applications 334 can remain static, but can be accessed by the application state engine 316 in order to determine a suitable action to initialize via the automated assistant 304.

In some implementations, the automated assistant 304 can include a field engine 324 for determining whether a particular entry field that a user has selected is associated with particular properties and/or meta data. For example, a particular entry field can be limited to numbers, letters, dates, years, currency, symbols, images, and/or any data that can be provided to an entry field of an interface. When the user has selected an entry field and provided a spoken utterance, the input processing engine 306 can process audio data corresponding to the spoken utterance in order to generate natural language text characterizing the spoken utterance. A classification engine 322 of the automated assistant 304 can process portions of the text to determine whether the text corresponds to a command directed to the automated assistant 304 or other speech that may have been captured via the computing device 302.

Text identified as intended to be a command for the automated assistant 304 can be processed by the field engine 324 to determine whether any portion of the text is suitable for incorporating into an entry field that has been selected by the user. When a portion of the text is determined to be suitable for the entry field, the portion of the text can be incorporated into the entry field by the automated assistant 304. Additionally, or alternatively, the text can be processed by a candidate engine 318 to determine whether there are any alternative interpretations and/or reference content that is intended to be the content incorporated into the entry field. For example, the candidate engine 318 can process one or more portions of the text of the spoken utterance with the contextual data 336 in order to generate other suitable interpretations of the text and/or other suitable content (e.g., images, videos, audio, etc.). When a candidate interpretation is identified, the candidate interpretation can be processed by the field engine 324 to determine whether the candidate interpretation is suitable for entry into the entry field. When the candidate interpretation is determined to be suitable for the entry field, and more relevant than any other candidate for entry into the entry field, the automated assistant 304 can cause the candidate interpretation to be incorporated into the entry field.

When the candidate interpretation is determined to not be suitable for entry into the entry field, text corresponding to the candidate interpretation can be further processed by the input processing engine 306. The input processing engine 306 can determine whether the candidate interpretation corresponds to a query that can be responded to by the automated assistant 304. Should the automated assistant 304 determine that the text corresponding to the candidate interpretation is a query that the automated assistant 304 can respond to, the automated assistant 304 can proceed with responding to the query. In this way, the user would not have to necessarily repeat their spoken utterance despite having selected an entry field immediately before providing spoken utterance. Furthermore, this allows the automated assistant 304 to preserve computational resources by limiting how much audio data is buffered. For instance, in this example, the user is able to fluidly converse with the automated assistant 304 without being required to repeatedly provide an invocation phrase to initialize the automated assistant 304 each time, thereby decreasing an amount of audio data that is occupying memory of the computing device 302.

Figure 4:
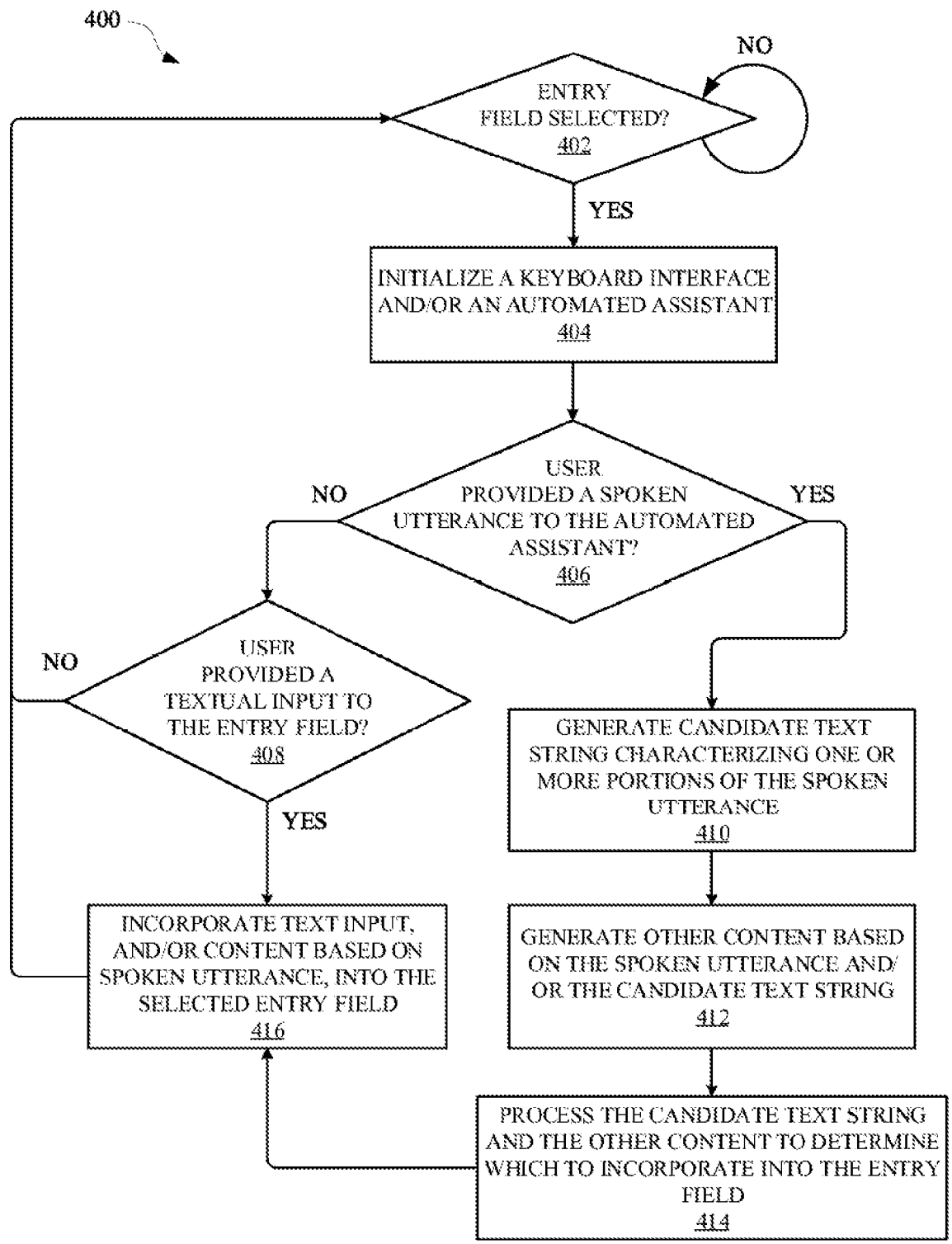
FIG. 4 illustrates a method for providing an automated assistant that can determine whether to incorporate one of multiple candidate interpretations into an entry field.

FIG. 4 illustrates a method 400 for providing an automated assistant that can determine whether to incorporate a verbatim interpretation and/or referenced content into an entry field that a user selected via an application interface. The method 400 can be performed by one or more computing devices, applications, and/or any other apparatus or module that can be associated with an automated assistant. The method 400 can include an operation 402 of determining whether an entry field has been selected by a user. When an entry field is determined to have been selected by a user, the method 400 can proceed to an operation 404 of initializing an automated assistant and/or a keyboard interface. The automated assistant and/or keyboard interface can be initialized when the user is accessing the application that includes the entry field that the user has selected.

The method 400 can proceed from the operation 404 to an operation 406 for determining whether the user has provided a spoken utterance to the automated assistant. When the user is determined to have provided a spoken utterance to the automated assistant, the method 400 can proceed to an operation 410. When the user is determined to have not provided a spoken utterance, the method 400 can proceed from the operation 406 to an operation 408, which can include determining whether the user provided a textual input to the entry field. When the user is determined to have not provided a textual input to the entry field, the method 400 can return to the operation 402. However, when the user is determined to have provided textual input to the entry field, the method 400 can proceed from the operation 508 to an operation 416 for incorporating the text into the selected entry field.

When the user is determined to have provided the spoken utterance to the automated assistant, the method 400 can proceed to an operation 410, which can include generating a candidate text string characterizing one or more portions of the spoken utterance. In some implementations, generating the candidate text string can include generating a text string that is intended to be a verbatim characterization of the spoken utterance. The method 400 can proceed from the operation 410 to an operation 412 for generating other content based on the spoken utterance. The other content can be generated based on the spoken utterance, the candidate text string, and/or contextual data characterizing a circumstance in which the user provided the spoken utterance and/or historical data associated with interactions between the user and the application.

The method 400 can proceed from the operation 412 to an operation 414 that includes processing the candidate text string and/or the other content to determine which to incorporate into the entry field. In other words, the operation 414 includes determining whether to incorporate one or more portions of the candidate text string and/or one or more portions of the other content into the selected entry field. When the determination is made regarding whether to incorporate the candidate text string or other content into the entry field, the method 400 can proceed from the operation 414 to an operation 416. The operation 416 can include incorporating content, which is based on the spoken utterance, into the selected entry field. In other words, depending on whether the candidate text string or other content has been prioritized at operation 414, the method 400 can incorporate the candidate text string and/or the other content into the selected entry field at the operation 416.

Figure 5A:
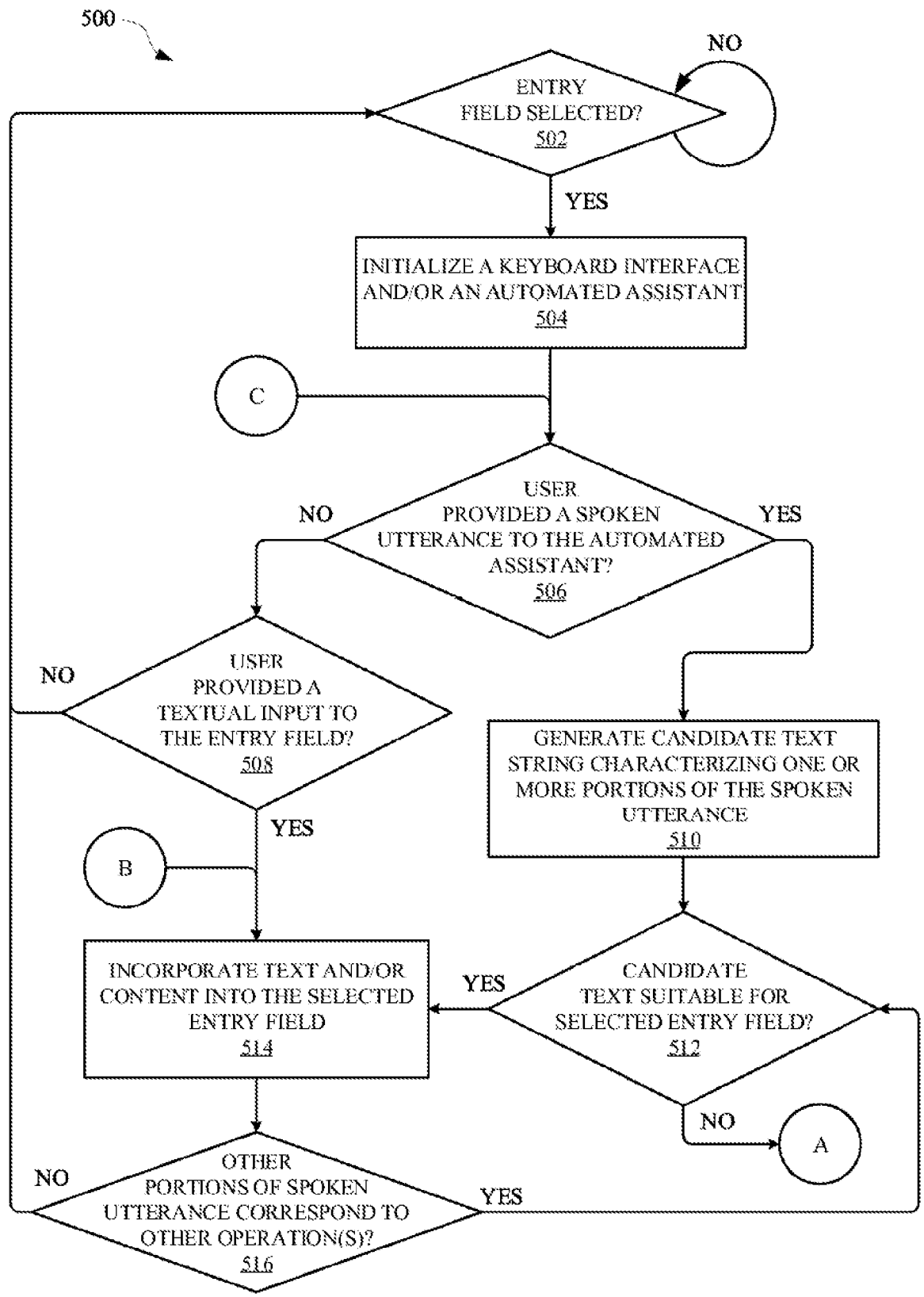
FIG. 5A and FIG. 5B illustrate methods for providing an automated assistant that can determine whether to incorporate a verbatim interpretation and/or referenced content into an entry field that a user selected via an application interface.
Figure 5B:
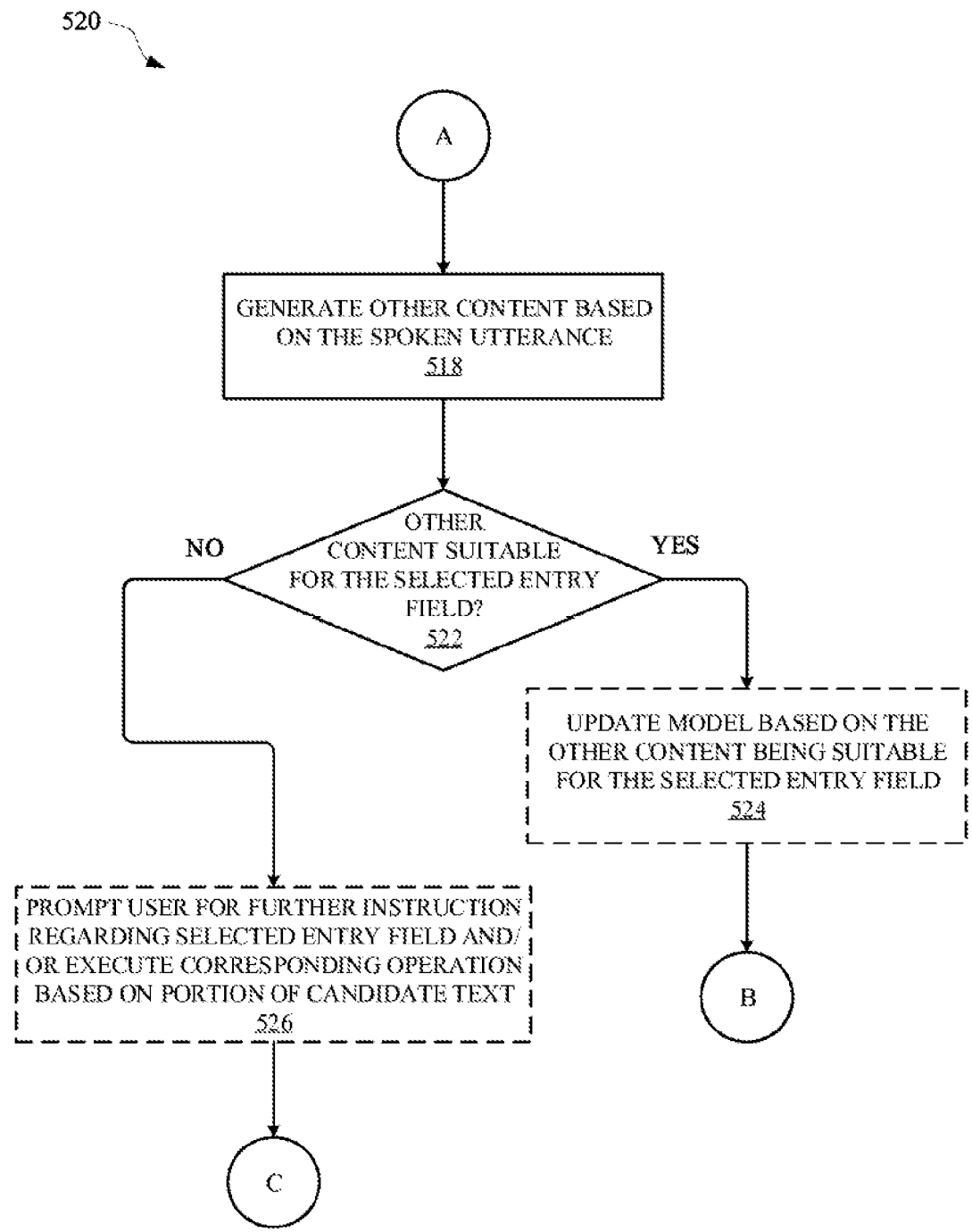

FIG. 5A and FIG. 5B illustrate method 500 and method 520 for providing an automated assistant that can determine whether to incorporate a verbatim interpretation and/or referenced content into an entry field that a user selected via an application interface. The method 500 and method 520 can be performed by one or more computing devices, applications, and/or any other apparatus or module that can be associated with an automated assistant. The method 500 can include an operation 502 of determining whether an entry field has been selected by a user. The entry field be one or more portions of an application interface that includes an area for the user to specify particular content for the entry field. As an example, the entry field can be a space on a web page at which the user can designate their phone number. For instance, the web page can include an entry field such as "Phone Number: \_\_\_\_\_-\_\_\_\_\_," in order that an entity that controls the web page can call the user regarding a service offered by the web page (e.g., a travel booking service).

When entry field is determined to have been selected, the method 500 can proceed from the operation 502 to an operation 504, which can include initializing a keyboard interface and/or an automated assistant. Otherwise, the application and/or corresponding computing device can continue to monitor for inputs to the application. In some implementations, the keyboard interface and/or the automated assistant can be initialized in response to the user selecting the entry field of the application interface. For instance, the entry field can be rendered at a touch display panel of a computing device and the user can select the entry field by performing a touch gesture that indicates a selection of the entry field. Additionally, or alternatively, the user can select the entry field by providing a spoken utterance and/or providing an input to a separate computing device.

The method 500 can proceed from an operation 504 to an operation 506, which can include determining whether the user provided a spoken utterance to the automated assistant. Subsequent to the user providing a selection of the entry field, the user can optionally elect to provide a spoken utterance that is intended to assist the automated assistant with incorporating content into the entry field and/or otherwise intended. For instance, after the user selects the phone number entry field of the web page, the user can provide a spoken utterance such as, "Triple five, triple six, eight . . . also, what is the weather tomorrow, Assistant?" However, they user may alternatively elect to not provide a spoken utterance.

When the user elects to not provide a spoken utterance, the method 500 can proceed from the operation 506 to an operation 508, which can include determining whether the user provided a textual input to the entry field. When the user is determined to have not provided a textual input to the entry field, the method 500 can return to the operation 502. However, when the user is determined to have provided textual input to the entry field, the method 500 can proceed from the operation 508 to an operation 514. The operation 514 can include incorporating text and/or content into the selected entry field. In this way, if the user has provided the textual input (e.g., user types on the keyboard: "555-6668") can be incorporated into the entry field. Alternatively, when, at operation 506, the user is determined to have provided a spoken utterance after selecting the entry field, the method 500 can proceed from the operation 506 to an operation 510.

The operation 510 can include generating candidate text string characterizing one or more portions of the spoken utterance. For example, the spoken utterance provided by the user can be, "Triple five, triple six, eight . . . also, what is the weather tomorrow, Assistant?" and a particular portion of the spoken utterance can be processed to provide a candidate text string such as "triple five, triple six, eight." The method 500 can then proceed from the operation 510 to an operation 512, which can include determining whether the candidate text string is suitable for the selected entry field. When the candidate text string is determined to be suitable for the selected entry field, the method 500 can proceed to the operation 414 in order to cause the candidate text to be incorporated into the selected entry field. However, when the candidate text string is determined to not be suitable for the selected entry field, the method 500 can proceed from the operation 512, via continuation element "A", to an operation 518 of method 520 provided in FIG. 5B.

The method 520 can proceed from continuation element "A" to the operation 518, which can include generating other content based on the spoken utterance. The other content can be generated based on contextual data and/or any other formation that can be relevant to a circumstance in which the user selected the entry field. For example, the application can include data characterizing properties of the selected entry field, and the candidate text string can be processed based on the data in order to bias certain other content that is based on the candidate text string. For example, other content can include other textual interpretations such as "triple 5, triple 6, 8," and "5556668." Furthermore, the data can characterize requirements that the selected entry field be occupied exclusively with numbers and that there be a minimum of 7 numbers. Therefore, processing of the requirement data and the other content can result in biasing of the textual interpretation "5556668" over "triple 5, triple 6, 8."

The method 520 can proceed from the operation 518 to an operation 522, which can include determining whether other content that has been generated is suitable for the selected entry field. For example, candidate content "5556668" can be determined to suitable for the selected entry field because the candidate content exclusively includes numbers, whereas the other candidate content "triple 5, triple 6, 8" can be determined to be not suitable because the other candidate content includes letters. When the no other content is determined to be suitable for the selected entry field, the method 500 can proceed from the operation 522 to an optional operation 526, which can include prompting the user for further instructions regarding the selected entry field. For instance, the automated assistant can provide a prompt that is based on the contextual data and/or any other data associated with the selected entry field. The automated assistant can, for example, render an audio output such as, "This field is for numbers," which can be generated based on a determination that the other content was not suitable because the other content included letters. Thereafter, the method 520 can proceed from the operation 526 and/or the operation 522, via continuation element "C," to operation 506 of the method 500 of FIG. 5A.

When the other content is determined to be suitable for the selected entry field, the method 520 can proceed from the operation 522 to an optional operation 524. The operation 524 can include updating a model based on determining that the other content is suitable for the selected entry field. In this way, the automated assistant can adaptively learn whether the user is intending certain spoken utterances to be in furtherance of incorporating content into a selected entry field and/or whether the user is directing the automated assistant to take one or more other actions. The method 520 can proceed from the operation 524 and/or the operation 522, via continuation element "B," to the operation 414, in which the automated assistant can cause the other content (e.g., the other content that is biased over any other generated content) to be incorporated into the selected entry field (e.g., "Phone Number: 555-6668").

The method 500 can proceed from the operation 414 to an operation 516 for determining whether other portions of the spoken utterance correspond an assistant operation. In other words, the automated assistant can determine whether any other particular portion of the candidate text string (e.g., besides the portion that was the basis for the other content) was provided in furtherance of one or more operations to be performed by the automated assistant. When no other portion of the candidate text string and/or spoken utterance is determined to be in furtherance of an assistant operation, the method 500 can proceed to the operation 502.

However, when another portion of the candidate text string is determined to have been provided in furtherance of an automated assistant operation (e.g., "also, what is the weather tomorrow, Assistant?"), the method 500 can proceed via method 500 and method 520 to the operation 526, in which a corresponding automated assistant operation is executed based on the other portion of the candidate text string. In other words, because the other portion of the candidate text string may not result in any other content suitable for a selected entry field at operation 522, and because the other candidate text string refers to an automated assistant operation at operation 526, the automated assistant operation can be executed. In this way, a user can rely on more efficient methods of speech to simultaneously provide inputs to an interface in order to fill out certain fields and directing the automated assistant to take other actions.

Figure 6:
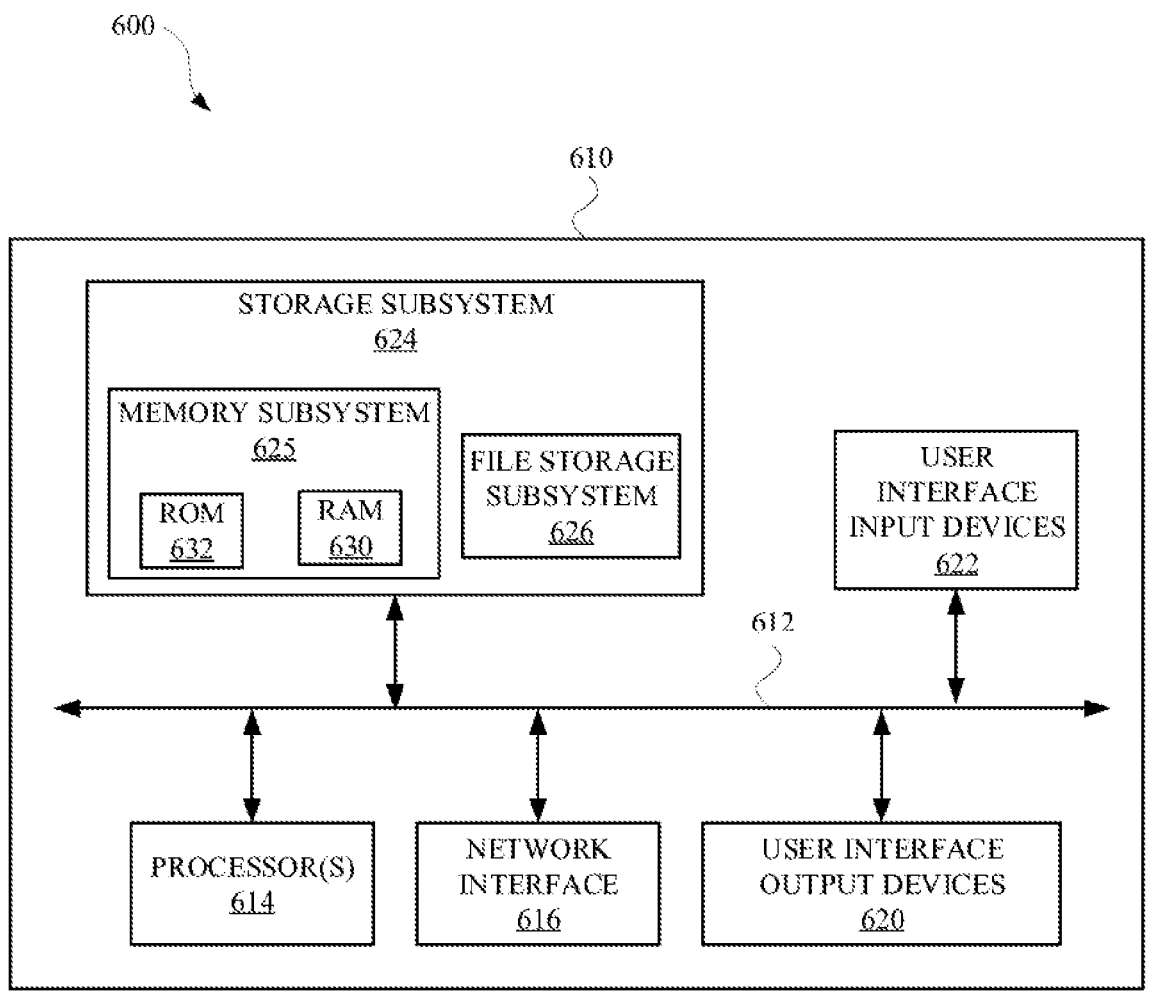
FIG. 6 is a block diagram of an example computer system.

FIG. 6 is a block diagram of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 624 may include the logic to perform selected aspects of method 400, method 500, and/or method 520, and/or to implement one or more of system 300, computing device 104, computing device 204, and/or any other application, device, apparatus, and/or module discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining that a selection of an entry field was provided to a graphical user interface of an application that is being rendered at a computing device. The computing device can provide access to an automated assistant that is separate from the application and utilizes one or more speech-to-text models stored at the computing device. The method can further include an operation of receiving, subsequent to determining that the entry field was selected, a spoken utterance from a user. The method can further include an operation of generating, based on the spoken utterance, a candidate text string that characterizes at least a portion of the spoken utterance provided by the user, wherein the candidate text string is generated using the one or more speech-to-text models stored at the computing device. The method can further include an operation of determining, by the automated assistant and based on the candidate text string, whether to incorporate the candidate text string into the entry field or incorporate additional content into the entry field. The method can further include an operation of, when a determination is made to incorporate the additional content into the entry field: causing the additional content to be provided as input to the entry field of the graphical user interface, wherein the additional content is generated via performance of one or more automated assistant actions that are based on the candidate text string. The method can further include an operation of, when a different determination is made to generate the additional content for incorporating into the entry field: causing the candidate text string to be provided as input to the entry field of the graphical user interface.

In some implementations, determining whether to incorporate the candidate text string into the entry field or incorporate the additional content into the entry field includes: determining whether the entry field is limited to a particular type of input content, and determining whether the candidate text string corresponds to the particular type of input content associated with the entry field. In some implementations, the particular type of input content includes contact information for the user or another person, and causing the additional content to be generated via performance of the one or more automated assistant actions includes: determining that contact data, accessible via the computing device, includes the additional content and is stored in association with at least a part of the candidate text string.

In some implementations, the additional content is void of textual characters that are derived from a primary language of the user. In some implementations, the additional content includes at least one image. In some implementations, determining that the selection of the entry field was provided to the graphical user interface includes: determining that a keyboard interface is being rendered over the graphical user interface of the application. In some implementations, causing the candidate text string to be provided as input to the entry field of the graphical user interface includes: causing the candidate text string to be provided as input to a keyboard application from the automated assistant, wherein the keyboard application provides the keyboard interface that is rendered over the graphical user interface. In some implementations, the keyboard application is a separate application from the automated assistant. In some implementations, the additional content is generated without further use of the one or more speech-to-text models and is different from the candidate text string.

In other implementations, a method implemented by one or more processors is set forth as including operations such as receiving, when an entry field of a graphical user interface of an application is being rendered at a computing device, a spoken utterance from a user, wherein the computing device provides access to an automated assistant that is separate from the application and utilizes one or more speech-to-text models stored at the computing device. In some implementations, the method can further include an operation of generating, based on the spoken utterance, a candidate text string that characterizes at least a portion of the spoken utterance provided by the user, wherein the candidate text string is generated using the one or more speech-to-text models stored at the computing device. In some implementations, the method can further include an operation of determining, by the automated assistant and based on the candidate text string, whether to consider any particular portion of the candidate text string as invoking a particular assistant operation that is different from an operation of incorporating a particular portion of the candidate text string into the entry field and different from another operation of incorporating additional content into the entry field.

In some implementations, the method can further include an operation of, when a determination is made to consider the particular portion of the candidate text string as invoking the assistant operation: causing the automated assistant to perform the particular assistant operation based at least on the particular portion of the candidate text string. In some implementations, the method can further include an operation of, when a different determination is made to not consider the particular portion of the candidate text string as not invoking the assistant operation: determining, by the automated assistant and based on the particular portion of the candidate text string, whether to incorporate the particular portion of the candidate text string into the entry field or incorporate the additional content into the entry field, and causing, based on determining whether to incorporate the particular portion of the candidate text string into the entry field or incorporate the additional content into the entry field, the particular portion of the candidate text string or the additional content to be provided as input to the entry field of the graphical user interface.

In some implementations, determining whether to incorporate the particular portion of the candidate text string into the entry field or incorporate the additional content into the entry field includes: determining whether the entry field is limited to a particular type of input content, and determining whether the particular portion of the candidate text string corresponds to the particular type of input content associated with the entry field. In some implementations, wherein the additional content is generated without further use of the one or more speech-to-text models and is different from the candidate text string. In some implementations, the additional content is void of textual characters that are derived from a primary language of the user. In some implementations, the additional content includes at least one image. In some implementations, causing the automated assistant to perform the assistant operation includes executing a web search based on the particular portion of the candidate text string.

In yet other implementations, a method implemented by one or more processors is set forth as including operations such as receiving, when an application is being accessed via a computing device, a spoken utterance from a user, wherein the computing device provides access to an automated assistant that is separate from the application and utilizes one or more speech-to-text models. The method can further include an operation of generating, based on the spoken utterance, a candidate text string that characterizes at least a portion of the spoken utterance provided by the user, wherein the candidate text string is generated using the one or more speech-to-text models stored at the computing device. The method can further include an operation of determining, by the automated assistant and based on the candidate text string, whether to provide the candidate text string as an input to the application or provide additional content as the input to the application. The method can further include an operation of, when a determination is made to incorporate the additional content into the entry field: generating the additional content based on the candidate text string and contextual data, wherein the contextual data characterizes a context in which the user provided the spoken utterance, and causing the additional content to be provided as input to the application.

In some implementations, the method can further include an operation of, when a different determination is made to provide the candidate text string as the input to the application: causing the candidate text string to be provided as the input to the application. In some implementations, the method can further include an operation of, when a determination is made to incorporate the additional content into the entry field: bypassing rendering the candidate text string at a graphical user interface of the computing device. In some implementations, the contextual data characterizes content of a graphical user interface of the application. In some implementations, the contextual data characterizes one or more previous interactions between the user and the automated assistant. In some implementations, the contextual data characterizes a limitation on formatting of content to be incorporated into the entry field.

In yet other implementations, a method implemented by one or more processors is set forth as including operations such as determining that a selection of a keyboard element was provided to a graphical user interface of keyboard application that is being rendered at a computing device, wherein the computing device provides access to an automated assistant that is separate from the keyboard application and utilizes one or more speech-to-text models. The method can further include an operation of receiving, subsequent to determining that the keyboard element was selected, a spoken utterance from a user, wherein the user is accessing a particular application that includes an entry field when the user provides the spoken utterance. The method can further include an operation of generating, based on the spoken utterance, a candidate text string that characterizes at least a portion of the spoken utterance provided by the user, wherein the candidate text string is generated using the one or more speech-to-text models stored at the computing device. The method can further include an operation of determining, by the automated assistant and based on the candidate text string, whether to incorporate the candidate text string into the entry field or incorporate additional content into the entry field. The method can further include an operation of, when a determination is made to incorporate the additional content into the entry field: causing the additional content to be provided as input to the entry field of the graphical user interface, wherein the additional content is generated via performance of one or more automated assistant actions that are based on the candidate text string.

In some implementations, the method can further include an operation of, when a different determination is made to generate the additional content for incorporating into the entry field: causing the candidate text string to be provided as input to the entry field of the graphical user interface. In some implementations, the additional content is void of textual characters that are derived from a primary language of the user. In some implementations, the additional content includes at least one image. In some implementations, the additional content is generated without further use of the one or more speech-to-text models and is different from the candidate text string.

We claim:

1. A method implemented by one or more processors, the method comprising:
   determining that a selection of an entry field of a graphical user interface of an application that is being rendered at a computing device was provided,
      wherein the computing device provides access to an automated assistant that is separate from the application and utilizes one or more speech-to-text models stored at the computing device;
receiving, subsequent to determining that the entry field was selected, a spoken utterance from a user;
generating, based on the spoken utterance, a candidate text string that characterizes at least a portion of the spoken utterance provided by the user,
wherein the candidate text string is generated using the one or more speech-to-text models stored at the computing device;
determining, by the automated assistant and based on the candidate text string, whether to incorporate the candidate text string into the entry field or whether to incorporate non-textual visual content into the entry field and in lieu of the candidate text string,
wherein determining, by the automated assistant and based on the candidate text string, whether to incorporate the candidate text string into the entry field or whether to incorporate the non-textual visual content into the entry field comprises:
determining, based on processing the candidate text string, the non-textual visual content;
identifying, based on the non-textual visual content, one or more non-textual visual content properties of the non-textual visual content; and
determining, based on comparing the one or more non-textual visual content properties of the non-textual visual content to one or more entry field properties of the entry field, whether to incorporate the candidate text string into the entry field or whether to incorporate the non-textual visual content into the entry field;
when a determination is made to incorporate the non-textual visual content into the entry field:
causing the non-textual visual content to be provided as input to the entry field of the graphical user interface, wherein the non-textual visual content is determined via performance of one or more automated assistant actions that are based on the candidate text string; and
when a different determination is made to incorporate the candidate text string into the entry field:
causing the candidate text string to be provided as input to the entry field of the graphical user interface.

2. The method of claim 1,
wherein determining, by the automated assistant and based on the candidate text string, whether to incorporate the candidate text string into the entry field or incorporate the non-textual visual content into the entry field further comprises:
determining whether the entry field is limited to a particular type of input content, and
determining whether the candidate text string corresponds to the particular type of input content associated with the entry field.

3. The method of claim 1, wherein the non-textual visual content is void of textual characters that are derived from a primary language of the user.

4. The method of claim 1, wherein the non-textual visual content includes at least one image.

5. The method of claim 1, wherein determining that the selection of the entry field of the graphical user interface was provided includes:
determining that a keyboard interface is being rendered over the graphical user interface of the application.

6. The method of claim 5, wherein causing the candidate text string to be provided as input to the entry field of the graphical user interface includes:
causing the candidate text string to be provided as input to a keyboard application from the automated assistant, wherein the keyboard application provides the keyboard interface that is rendered over the graphical user interface.

7. The method of claim 6, wherein the keyboard application is a separate application from the automated assistant.

8. The method of claim 1, wherein the non-textual visual content is determined without further use of the one or more speech-to-text models and is different from the candidate text string.

9. The method of claim 1, wherein determining, by the automated assistant and based on the candidate text string, whether to incorporate the candidate text string into the entry field or incorporate the non-textual visual content into the entry field further comprises:
determining whether the candidate text string corresponds to any automated assistant command.

10. The method of claim 9, wherein determining whether the candidate text string corresponds to any automated assistant command comprises:
processing the candidate text string using a natural language understanding (NLU) engine of the automated assistant, and
determining, based on the processing using the NLU engine, whether an automated assistant intent is embodied in the candidate text string.

11. The method of claim 1, further comprising:
determining the one or more entry field properties of the entry field based on:
HTML or XML tags associated with the entry field, or text and/or graphics within a threshold distance of the entry field.

12. The method of claim 1, wherein determining, by the automated assistant and based on the candidate text string, whether to incorporate the candidate text string into the entry field or to incorporate the non-textual visual content into the entry field further comprises:
determining whether one or more initial terms, of the candidate text string, match one or more predefined terms; and
biasing toward determining to incorporate the non-textual visual content responsive to determining that the one or more initial terms match the one or more predefined terms.

13. The method of claim 1, wherein the non-textual visual content is determined based on a portion of the candidate text string, and wherein, when the determination is made to incorporate the non-textual visual content into the entry field, the method further comprises:
causing an additional portion of the candidate text string, that is in addition to the portion of the candidate text string utilized in determining the non-textual visual content, to be provided as additional input to the entry field of the graphical user interface along with the non-textual visual content.

14. A system comprising:
at least one hardware processor; and
at least one memory storing instructions that, when executed, cause the at least one hardware processor to:
determine that a selection of an entry field of a graphical user interface of an application that is being rendered at a computing device was provided, wherein the computing device provides access to an automated assistant that is separate from the application and utilizes one or more speech-to-text models stored at the computing device;

receive, subsequent to determining that the entry field was selected, a spoken utterance from a user;

generate, based on the spoken utterance, a candidate text string that characterizes at least a portion of the spoken utterance provided by the user,
wherein the candidate text string is generated using the one or more speech-to-text models stored at the computing device;

determine, by the automated assistant and based on the candidate text string, whether to incorporate the candidate text string into the entry field or whether to incorporate non-textual visual content into the entry field and in lieu of the candidate text string, wherein determining, by the automated assistant and based on the candidate text string, whether to incorporate the candidate text string into the entry field or whether to incorporate the non-textual visual content into the entry field comprises:
determining, based on processing the candidate text string, the non-textual visual content;
identifying, based on the non-textual visual content, one or more non-textual visual content properties of the non-textual visual content; and
determining, based on comparing the one or more non-textual visual content properties of the non-textual visual content to one or more entry field properties of the entry field, whether to incorporate the candidate text string into the entry field or whether to incorporate the non-textual visual content into the entry field;

when a determination is made to incorporate the non-textual visual content into the entry field:
cause the non-textual visual content to be provided as input to the entry field of the graphical user interface, wherein the non-textual visual content is determined via performance of one or more automated assistant actions that are based on the candidate text string; and when a different determination is made to incorporate the candidate text string into the entry field:
cause the candidate text string to be provided as input to the entry field of the graphical user interface.

15. The system of claim 14, wherein the non-textual visual content is determined based on a portion of the candidate text string, and wherein, when the determination is made to incorporate the non-textual visual content into the entry field, the system further comprises instructions to:
cause an additional portion of the candidate text string, that is in addition to the portion of the candidate text string utilized in determining the non-textual visual content, to be provided as additional input to the entry field of the graphical user interface along with the non-textual visual content.

16. A non-transitory computer-readable storage medium storing instructions that, when executed, cause at least one hardware processor to:

determine that a selection of an entry field of a graphical user interface of an application that is being rendered at a computing device was provided,
wherein the computing device provides access to an automated assistant that is separate from the application and utilizes one or more speech-to-text models stored at the computing device;

receive, subsequent to determining that the entry field was selected, a spoken utterance from a user;

generate, based on the spoken utterance, a candidate text string that characterizes at least a portion of the spoken utterance provided by the user,
wherein the candidate text string is generated using the one or more speech-to-text models stored at the computing device;

determine, by the automated assistant and based on the candidate text string, whether to incorporate the candidate text string into the entry field or whether to incorporate non-textual visual content into the entry field and in lieu of the candidate text string, wherein determining, by the automated assistant and based on the candidate text string, whether to incorporate the candidate text string into the entry field or whether to incorporate the non-textual visual content into the entry field comprises:
determining, based on processing the candidate text string, the non-textual visual content;
identifying, based on the non-textual visual content, one or more non-textual visual content properties of the non-textual visual content; and
determining, based on comparing the one or more non-textual visual content properties of the non-textual visual content to one or more entry field properties of the entry field, whether to incorporate the candidate text string into the entry field or whether to incorporate the non-textual visual content into the entry field;

when a determination is made to incorporate the non-textual visual content into the entry field:
cause the non-textual visual content to be provided as input to the entry field of the graphical user interface, wherein the non-textual visual content is determined via performance of one or more automated assistant actions that are based on the candidate text string; and when a different determination is made to incorporate the candidate text string into the entry field:
cause the candidate text string to be provided as input to the entry field of the graphical user interface.

17. The non-transitory computer-readable storage medium of claim 16, wherein the non-textual visual content is determined based on a portion of the candidate text string, and wherein, when the determination is made to incorporate the non-textual visual content into the entry field, the non-transitory computer-readable storage medium further comprising instructions to:
cause an additional portion of the candidate text string, that is in addition to the portion of the candidate text string utilized in determining the non-textual visual content, to be provided as additional input to the entry field of the graphical user interface along with the non-textual visual content.

* * * * *